(12) United States Patent
El-Hibri et al.

(10) Patent No.: US 9,145,499 B2
(45) Date of Patent: Sep. 29, 2015

(54) POLYARYLENE COMPOSITION

(71) Applicant: Solvay Specialty Polymers USA, L.L.C.

(72) Inventors: Mohammad Jamal El-Hibri, Atlanta, GA (US); Nikica Maljkovic, New Orleans, LA (US); Romana B. Chavers, Kiln, MS (US); Henri Massillon, Waremme (BE)

(73) Assignee: SOLVAY SPECIALTY POLYMERS USA, LLC, Alpharetta, GA (US)

(*) Notice: Subject to any disclaimer, the term of this patent is extended or adjusted under 35 U.S.C. 154(b) by 0 days.

(21) Appl. No.: 13/726,705

(22) Filed: Dec. 26, 2012

(65) Prior Publication Data

US 2013/0217834 A1    Aug. 22, 2013

Related U.S. Application Data

(63) Continuation of application No. 12/061,442, filed on Apr. 2, 2008, now abandoned, which is a continuation-in-part of application No. PCT/EP2007/052102, filed on Mar. 6, 2007, said application No. 12/061,442 is a continuation-in-part of (Continued)

(51) Int. Cl.
| | |
|---|---|
| *C08L 71/08* | (2006.01) |
| *C08G 75/23* | (2006.01) |
| *C08L 65/02* | (2006.01) |
| *C08L 71/00* | (2006.01) |
| *C08L 81/06* | (2006.01) |

(52) U.S. Cl.
CPC .................. *C08L 71/08* (2013.01); *C08G 75/23* (2013.01); *C08L 65/02* (2013.01); *C08L 71/00* (2013.01); *C08L 81/06* (2013.01); *C08G 2261/312* (2013.01); *C08G 2650/40* (2013.01)

(58) Field of Classification Search
None
See application file for complete search history.

(56) References Cited

U.S. PATENT DOCUMENTS

| | | | |
|---|---|---|---|
| 4,176,222 | A | 11/1979 | Cinderey et al. |
| 4,228,218 | A | 10/1980 | Takayanagi et al. |
| 5,227,457 | A | 7/1993 | Marrocco et al. |
| 5,539,048 | A | 7/1996 | Gagne et al. |
| 5,565,543 | A | 10/1996 | Marrocco et al. |
| 5,646,231 | A | 7/1997 | Marrocco et al. |
| 5,654,392 | A | 8/1997 | Marrocco et al. |
| 5,659,005 | A | 8/1997 | Marrocco et al. |
| 5,668,245 | A | 9/1997 | Marrocco et al. |
| 5,670,564 | A | 9/1997 | Gagne et al. |

(Continued)

FOREIGN PATENT DOCUMENTS

| | | |
|---|---|---|
| CA | 847963 | 7/1970 |
| DE | 4015542 | 11/1991 |

(Continued)

OTHER PUBLICATIONS

English abstracts of JP 61037417 Feb. 22, 1986.*

(Continued)

*Primary Examiner* — Alicia Bland

(57) ABSTRACT

Blend (B) comprising at least one polyarylene in a form other than fibers, and at least one poly(aryl ether ketone).
Blend (T) comprising at least one polyarylene, at least one poly(aryl ether ketone) and at least one poly(aryl ether sulfone).
Article or part of an article comprising the blend (B) or the blend (T).

4 Claims, 2 Drawing Sheets

Related U.S. Application Data application No. 11/850,739, filed on Sep. 6, 2007, now Pat. No. 7,750,091, which is a continuation of application No. PCT/EP2006/060535, filed on Mar. 7, 2006.

(60) Provisional application No. 60/909,541, filed on Apr. 2, 2007, provisional application No. 60/912,989, filed on Apr. 20, 2007, provisional application No. 60/836,946, filed on Aug. 11, 2006, provisional application No. 60/842,369, filed on Sep. 6, 2006, provisional application No. 60/842,367, filed on Sep. 6, 2006, provisional application No. 60/842,368, filed on Sep. 6, 2006, provisional application No. 60/842,366, filed on Sep. 6, 2006, provisional application No. 60/842,365, filed on Sep. 6, 2006.

(56) References Cited

U.S. PATENT DOCUMENTS

| | | |
|---|---|---|
| 5,721,335 A | 2/1998 | Marrocco et al. |
| 5,756,581 A | 5/1998 | Marrocco et al. |
| 5,760,131 A | 6/1998 | Marrocco et al. |
| 5,824,744 A | 10/1998 | Gagne et al. |
| 5,827,927 A | 10/1998 | Gagne et al. |
| 5,869,592 A | 2/1999 | Gagne et al. |
| 5,886,130 A * | 3/1999 | Trimmer et al. ............ 528/171 |
| 6,087,467 A | 7/2000 | Marrocco et al. |
| 6,566,484 B2 | 5/2003 | Gharda et al. |
| 2003/0130476 A1 | 7/2003 | Kemmish et al. |
| 2006/0207464 A1 | 9/2006 | Maljkovic et al. |
| 2008/0293840 A1 | 11/2008 | Maljkovic et al. |
| 2009/0036594 A1 | 2/2009 | Maljkovic et al. |
| 2009/0069507 A1 | 3/2009 | El-Hibri et al. |
| 2009/0069511 A1 | 3/2009 | Maljkovic et al. |

FOREIGN PATENT DOCUMENTS

| | | |
|---|---|---|
| EP | 436111 | 7/1991 |
| JP | 61037417 | 2/1986 |
| JP | 61037417 A * | 2/1986 |
| WO | WO 92/07024 | 4/1992 |
| WO | WO 93/18076 | 9/1993 |
| WO | WO 2006/094987 | 9/2006 |
| WO | WO 2006/094988 | 9/2006 |
| WO | WO 2007/101845 | 9/2007 |

OTHER PUBLICATIONS

Confidential sales data (no date).*
PCT Search Report dated Nov. 12, 2007, for International Application PCT/EP2007/052102 (3 pages).
Weast R.C., "Definitive Rules for Nomenclature of Organic Chemistry", CRC Handbook of Chemistry and Physics, 64$^{th}$ Editio, (1983-1984), p. C1-C44, CRC Press Inc., Boca Raton, Florida (44 pages).
Randic, M., "Aromaticity of Polycyclic Conjugated Hydrocarbons", Chemical Reviews (2003), vol. 103, pp. 3449-3605, American Chemical Society (158 pages).
Flory, P.J., "Principles of Polymer Chemistry," 1953, Chapter 13, p. 555, Cornell University Press (2 pages).
Standard ASTM D790, Historical 2003, "Test Methods for Flexural Properties of Unreinforced and Reinforced Plastics and Electrical Insulating Materials," pp. 1-11.
Standard ASTM D648, Historical 2006, "Test Method for Deflection Temperature of Plastics Under Flexural Load in the Edgewise Position," pp. 1-13.
Standard ASTM D638, Historical 2003, "Test Method for Tensile Properties of Plastics,", pp. 1-15.
Standard ASTM D4812, 2006, "Test Method for Unnotched Cantilever Beam Impact Resistance of Plastics," pp. 1-12.
Zoller, P., et al., "Pressure-Volume-Temperature Properties of Blends of Poly(2,6-dimethyl-1,4-phenylene Ether) with Polystyrene", Journal of Polymer Science: Polymer Physics Edition (1982), vol. 20, pp. 1385-1397, John Wiley and Sons, Inc.
Standard ASTM D4810, 2006 "Test Method for Hydrogen Sulfide in Natural Gas Using Length-of-Stain Detector Tubes,", pp. 1-3.
Marrocco, M., et al., "Poly-X™ Self Reinforced Polymers: Processible Molecular Composites", 39$^{th}$ International SAMPE Symposium and Exhibition (1994), Apr. 11-14. pp. 1063-1072, Society for the Advancement of Material and Process Engineering.
Naitove, M.H., "Self-Reinforcing Thermoplastic is Harder, Stronger, Stiffer without Added Fibers," Plastics Technology (Jul. 2003), Gardner Publications, Inc.
Confidential Sales Information (1 page).

* cited by examiner

POLYARYLENE COMPOSITION

CROSS-REFERENCE TO RELATED APPLICATIONS

The present application is a continuation application of U.S. Ser. No. 12/061,442, filed Apr. 2, 2008, which claims the benefit under 35 USC 119(e) of (1) U.S. provisional application No. 60/909,514 filed Apr. 2, 2007, (2) U.S. provisional application No. 60/912,989 filed Apr. 20, 2007; (3) is a continuation-in-part of PCT application no. PCT/EP2007/052102 filed Mar. 6, 2007, which is a continuation-in-part of PCT application no. PCT/EP2006/060535 filed Mar. 7, 2006 (now U.S. application Ser. No. 11/850,739), PCT application no. PCT/EP2007/052102 claiming priority to U.S. provisional application No. 60/836,946 filed Aug. 11, 2006, U.S. provisional application No. 60/842,369 filed Sep. 6, 2006, U.S. provisional application No. 60/842,367 filed Sep. 6, 2006, U.S. provisional application No. 60/842,368 filed Sep. 6, 2006, U.S. provisional application No. 60/842,366 filed Sep. 6, 2006, and U.S. provisional application No. 60/842,365 filed Sep. 6, 2006, and (4) is a continuation-in-part of U.S. application Ser. No. 11/850,739 filed Sep. 6, 2007, which is a continuation of PCT application no. PCT/EP2006/060535 filed Mar. 7, 2006, the entirety of all applications being herein incorporated by reference.

FIELD OF THE INVENTION

The present invention relates to a new polyarylene composition, and to articles and part of articles made thereof.

In particular, described herein are blends comprising a polyarylene and a poly(aryl ether ketone).

BACKGROUND OF THE INVENTION

Polyarylenes, especially polyphenylenes, exhibit some outstanding performance properties, including exceptionally high strength, stiffness, hardness, scratch resistance and dimensional stability. Unfortunately, polyarylenes have some limitations in toughness-related properties, in particular in terms of impact resistance and elongation properties. They have also limitations in melt processability due to their high viscosities, and tend to be anisotropic when melt fabricated under high shear such as during injection molding. Also, they have some limitations in chemical resistance. Also, they have some limitations in thermal resistance, which may cause some undesirable outgassing (weight loss) when submitted at very high temperature (380° C. or so).

Poly(aryl ether ketone)s, especially polyetheretherketones, exhibit also some outstanding properties, including exceptionally high melting point, excellent chemical resistance (including environmental stress cracking resistance) and excellent thermal stability. They have also high strength, stiffness, although somewhat lower than that of polyarylenes, and very good elongation properties. On the other hand, like polyarylenes, they have some limitations in terms of impact resistance.

Polymer blends have been widely taught and employed in the art. As broad as this statement may be, the blending of polymers remains an empirical art and the selection of polymers for a blend giving special properties is, in the main, an Edisonian-like choice. Certain attributes of polymer blends are more unique than others. The more unique attributes when found in a blend tend to be unanticipated properties. According to Zoller and Hoehn, Journal of Polymer Science, Polymer Physics Edition, vol. 20, pp. 1385-1397 (1982): "Blending of polymers is a useful technique to obtain properties in thermoplastic materials not readily achieved in a single polymer. Virtually all technologically important properties can be improved in this way, some of the more important ones being flow properties, mechanical properties (especially impact strength), thermal stability, and price ( . . . ). Ultimately, the goal of such modeling and correlation studies should be the prediction of blend properties from the properties of the pure components alone. We are certainly very far from achieving this goal."

In the field of miscibility or compatibility of polymer blends, the art has found predictability to be unattainable, even though considerable work on the matter has been done. According to authorities, "It is well known that, regarding the mixing of thermoplastic polymers, incompatibility is the rule and miscibility and even partial miscibility is the exception. Since most thermoplastic polymers are immiscible in other thermoplastic polymers, the discovery of a homogeneous mixture or partially miscible mixture of two or more thermoplastic polymers is, indeed, inherently unpredictable with any degree of certainty, for example, see P. J. Flory, Principles of Polymer Chemistry, Cornell University Press, 1953, Chapter 13, page 555."

U.S. Pat. No. 5,654,392 describes a class of polyphenylene polymers with phenylene units comprising a solubilizing side group which, because of this side group, are taught to help somehow in overcoming the problem of blending the rigid-rod and flexible components into a stable homogeneous phase (see col. 2, l. 60-63). Per US'392, the rigid-rod polymers can be blended with thermoplastics, thermosets, liquid crystalline polymers (LCP's), rubbers, elastomers, or any natural or synthetic polymeric material (col. 4, l. 16-20); US'392 keeps silent about the miscibility and compatibility of the polymers of such blends. It is of interest to note that, per US'392, only polymer blends containing a low amount of polyphenylene (at most 10 wt. %) with certain specific polymers could be prepared by a melt process [with polybutylene (example 23), nylon-6 (example 24), polystyrene and PPO (examples 24 and 25), polyethylene and polypropylene (example 25)], while blends comprising a higher amount of polyphenylene were prepared by solution mixing [blends with polystyrene (example 26) and polycarbonate (example 27)]; this suggests that the polymers involved in such blends have a very poor reciprocal miscibility/compatibility, or even are completely immiscible/incompatible, as many other couple of polymers are.

Example 13 of the same patent is a prophetic description (as evidenced by the use of the present tense and the absence of detailed operating conditions) of a pultrusion process involving a polyetheretherketone (PEEK) at molten state and fibers of a rigid-rod polyparaphenylene with a solubilizing group of high molecular weight, namely a poly 1,4-(4'-phenoxybenzoylphenylene). Accordingly, a fiber tow composed of the polyparaphephenylene fibers is continuously pulled through a PEEK melt and co-extruded through a die to form ribbed panels, which can be viewed as a composite material consisting of, as separate interconnected parts, essentially parallel polyphenylene fibers interconnected by a PEEK matrix so as to form a unified whole. In a pultrusion process, it is mandatory to preserve the fibrous nature of the fibers, so as to obtain a material with desirable properties, in particular a high modulus and strength; that the fibrous nature of the fiber is preserved in this prophetic example, is confirmed by the ribbed attribute of the panels (the ribs are deemed to be polyphenylene fibers), and also by the general teachings of US'392 about the pultrusion of polyphenylene fibers with thermoplastics (of undefined nature), from col. 21, l. 54 to col. 22, 1. 3: "Related to extrusion is pultrusion, wherein a fiber reinforcement is continuously added to an extruded polymer. ( . . . ) the polymers of the present invention may be used as the fiber for pultrusion of a thermoplastic having a lower processing temperature. ( . . . ) lower cost thermoplastics having moderate moduli and strength can be formed into composites with high moduli and strength by the incorporation of rigid-rod or segmented rigid-rod polyphenylene fibers. Such a composite is unique in that the reinforcing fibers are themselves thermoplastic and further processing at temperatures above the fiber Tg will result in novel structures as the fibers physically and/or chemically mix with the matrix." Back to example 13 specifically, by giving credit to a pultrusion process comprising which requires contacting, during a significant amount of time, polyphenylene fibers (which have a Tg as low as about 160° C.) with molten PEEK (PEEK at a temperature above about 340° C.) without affecting the fibrous nature of the polyphenylene fibers, US'392 gives thereby credit to the incompatibility and the immiscibility of polyphenylene also with PEEK, discarding thereby the skilled person from mixing a polyphenylene in a form other than fibers with PEEK in a significant amount so as to obtain a valuable blend, since, in such a case, the expectation would be great to obtain an unstable physical blend, highly subject to phase separation.

There remains a strong need for materials offering a superior balance of properties, including part or all of the following ones:
- very high strength;
- very high stiffness;
- good elongation properties;
- good melt processability (in particular, good injection moldability);
- high chemical resistance;
- outstanding thermal resistance [capable of inhibiting undesirable outgassing even when the material is submitted at very high temperature (380° C. or so)], desirably as high as that neat poly(aryl ether ketone); and
- outstanding impact resistance, as possibly characterized by a standard no-notch IZOD test (ASTM D-4810), desirably higher than that of neat polyarylene and neat poly (aryl ether ketone).

THE INVENTION

In its principal aspect, the present invention is directed to a blend (B) comprising:
at least one polyarylene (P1) in a form other than fibers, and
at least one poly(aryl ether ketone) (P2).

Another aspect of the present invention is directed to a method for preparing the blend (B) as above described which comprises mixing at least one polyarylene (P1) in a form other than fibers with at least one poly(aryl ether ketone) (P2), at a temperature above the melt temperature of the polyarylene (P1) and the melt temperature of the poly(aryl ether ketone) (P2).

Still another aspect of the present invention is directed to a shaped article or a part of a shaped article comprising the blend (B) as above described, or prepared by the method as above described.

Still other aspects of the present invention are directed to the use of at least one polyarylene (P1) as additive of a poly(aryl ether ketone) composition (B2°) comprising at least one poly(aryl ether ketone) (P2), for increasing the level of the impact resistance of the poly(aryl ether ketone) composition (B2°), as determined by a no-notch IZOD test (ASTM D-4810), up to a level which is higher than both that of the impact resistance of the poly(aryl ether ketone) composition (B2°) and that of the impact resistance of a polyarylene composition (B1°) obtained by replacing, weight for weight in the poly(aryl ether ketone) composition (B2°), all the poly(aryl ether ketone) (P2) by the polyarylene (P1), and, reciprocally, to the use of at least one poly(aryl ether ketone) (P2) as additive of a polyarylene composition (B1°) comprising at least one polyarylene (P1), for increasing the level of the impact resistance of the polyarylene composition (B1°), as determined by a no-notch IZOD test (ASTM D-4810), up to a level which is higher than both that of the impact resistance of the polyarylene composition (B1°) and that of the impact resistance of a poly(aryl ether ketone) composition (B2°) obtained by replacing, weight for weight in the polyarylene composition (B1°), all the polyarylene (P1) by the poly(aryl ether ketone) (P2).

Still another aspect of the present invention is directed to a blend (T) comprising:
at least one polyarylene (P1),
at least one poly(aryl ether ketone) (P2), and
at least one poly(aryl ether sulfone) (P3).

Still another aspect of the present invention is directed to a method for preparing the blend (T) as above described which comprises mixing the polyarylene (P1+) with the poly(aryl ether ketone) (P2) and the poly(aryl ether sulfone) (P3), at a temperature above the melt temperature of the poly(aryl ether ketone) (P2) and the melt temperature of the poly(aryl ether sulfone) (P3).

Still another aspect of the present invention is directed to a shaped article or a part of a shaped article comprising the blend (T) as above described, or prepared by the method as above described. The polymer blend (T) is well suited notably for producing a layer of a flexible pipe for transporting hydrocarbons.

BRIEF DESCRIPTION OF THE DRAWINGS

For a detailed description of the invention, reference will now be made to the accompanying drawings in which.

DETAILED DESCRIPTION OF THE INVENTION

Figure 1:
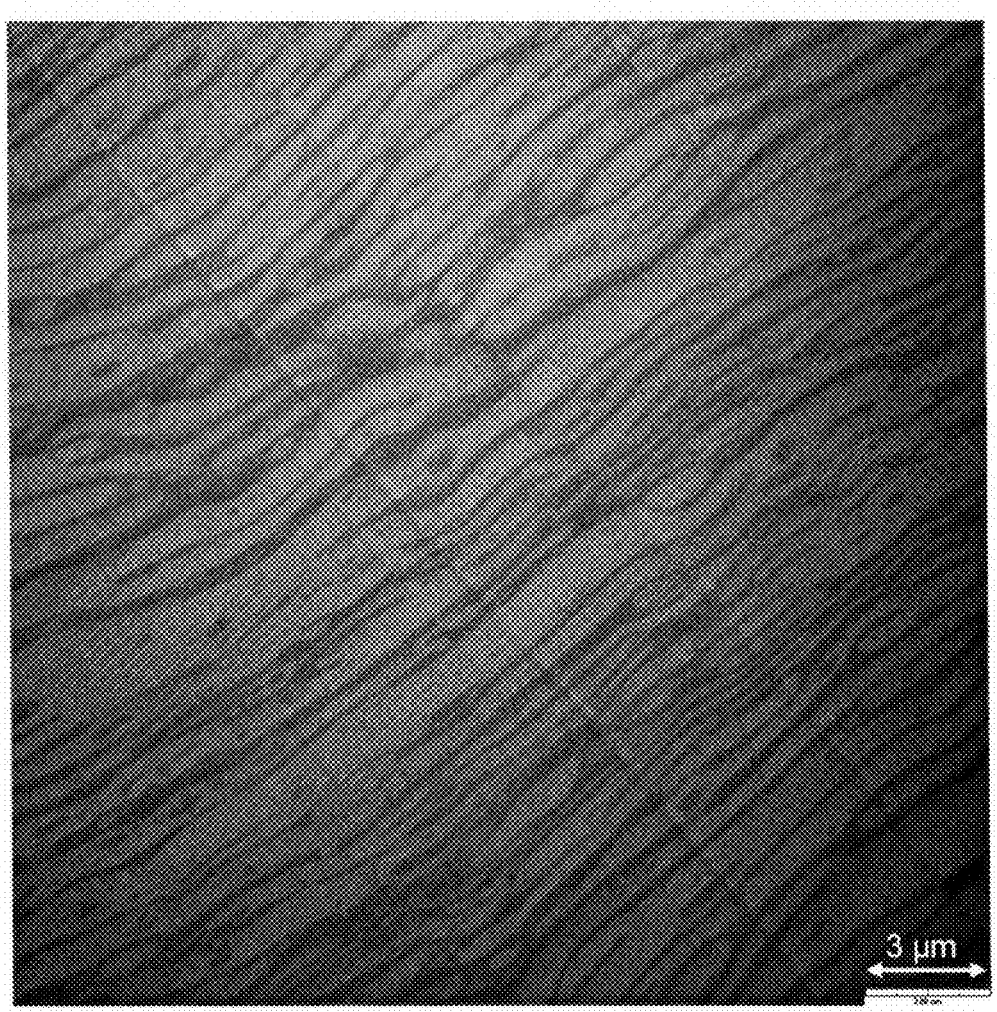
FIG. 1 represents a transmission electron microscope (TEM) photomicrograph showing the morphology of a ternary blend (called blend (T5)) with medium PEEK-polyphenylene content.

In the blend (B), the weight of the polyarylene (P1), based on the total weight of the polyarylene (P1) and the poly(aryl ether ketone) (P2), is advantageously of at least 15%, preferably at least 30%, more preferably at least 40%, still more preferably at least 50% and the most preferably at least 60%. On the other hand, the weight of the polyarylene (P1), based on the total weight of the polyarylene (P1) and the poly(aryl ether ketone) (P2), is advantageously of at most 90%, preferably at most 80%, and more preferably at most 70%.

In the blend (B), the total weight of the polyarylene (P1) and of the poly(aryl ether ketone) (P2), based on the total weight of the blend (B), is advantageously above 25%, preferably above 50%, more preferably above 80% and still more preferably above 95%. Excellent results were obtained when the blend (B) consisted essentially of, or even consisted of, the polyarylene (P1) and of the poly(aryl ether ketone) (P2).

In the blend (B), the weight of the polyarylene (P1), based on the total weight of the blend (B), is advantageously of at least 15%, preferably at least 30%, more preferably at least 40%, still more preferably at least 50% and the most preferably at least 60%. On the other hand, the weight of the polyarylene (P1), based on the total weight of the blend (B), is advantageously of at most 90%, preferably at most 80%, and still more preferably at most 70%.

In the blend (B), the weight of the poly(aryl ether ketone) (P2), based on the total weight of the blend (B), is advantageously of at least 10%, preferably at least 20% and more preferably at least 30%. On the other hand, the weight of the poly(aryl ether ketone) (P2), based on the total weight of the blend (B), is advantageously of at most 85%, preferably at most 70%, more preferably at most 60%, still more preferably at most 50% and the most preferably at most 40%.

The Polyarylene (P1)

For the purpose of the present invention, an arylene group is a hydrocarbon divalent group consisting of one core composed of one benzenic ring or of a plurality of benzenic rings fused together by sharing two or more neighboring ring carbon atoms, and of two ends.

Non limitative examples or arylene groups are phenylenes, naphthylenes, anthrylenes, phenanthrylenes, tetracenylenes, triphenylylenes, pyrenylenes, and perylenylenes. The arylene groups (especially the numbering of the ring carbon atoms) were named in accordance with the recommendations of the CRC Handbook of Chemistry and Physics, 64$^{th}$ edition, pages C1-C44, especially p. C11-C12.

Arylene groups present usually a certain level of aromaticity; for this reason, they are often reported as "aromatic" groups. The level of aromaticity of the arylene groups depends on the nature of the arylene group; as thoroughly explained in Chem. Rev. 2003, 103, 3449-3605, "Aromaticity of Polycyclic Conjugated Hydrocarbons", the level of aromaticity of a polycyclic aromatic hydrocarbon can be notably quantified by the "index of benzene character" B, as defined on p. 3531 of the same paper; values of B for a large set of polycyclic aromatic hydrocarbon are reported on table 40, same page.

An end of an arylene group is a free electron of a carbon atom contained in a (or the) benzenic ring of the arylene group, wherein an hydrogen atom linked to said carbon atom has been removed. Each end of an arylene group is capable of forming a linkage with another chemical group. An end of an arylene group, or more precisely the linkage capable of being formed by said end, can be characterized by a direction and by a sense; to the purpose of the present invention, the sense of the end of an arylene group is defined as going from the inside of the core of the arylene group to the outside of said core. As concerns more precisely arylene groups the ends of which have the same direction, such ends can be either of the same or opposite sense; also, their ends can be in the straight foregoing of each other, or not (otherwise said, they can be disjoint).

A polyarylene is intended to denote a polymer, other than a poly(aryl ether ketone) as defined below, of which more than 25 wt. % of the recurring units are recurring units (R1) of one or more formulae consisting of an optionally substituted arylene group, provided said optionally substituted arylene group is linked by each of its two ends to two other optionally substituted arylene groups via a direct C—C linkage. That the optionally substituted arylene group is linked by each of its two ends to two other optionally substituted arylene groups via a direct C—C linkage, is an essential feature of the recurring units (R1); thus, an arylene recurring unit which is linked by at least one of its two ends to a group other than an arylene group such as phenylene recurring units $\phi_1$, $\phi_2$ and $\phi_2'$ below:

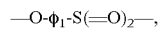

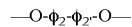

are not recurring units (R1) in the sense of the present invention.

The arylene groups of which the recurring units (R1) consist can be unsubstituted. Alternatively, they can be substituted by at least one monovalent substituting group.

The monovalent substituting group is usually not polymeric in nature; its molecular weight is preferably below 500, more preferably below 300, still more preferably below 200 and the most preferably below 150.

The monovalent substituting group is advantageously a solubilizing group. A solubilizing group is one increasing the solubility of the polyarylene (P1) in at least one organic solvent, in particular in at least one of dimethylformamide, N-methylpyrrolidinone, hexamethylphosphoric triamide, benzene, tetrahydrofuran and dimethoxyethane, which can be used as solvents during the synthesis of the polyarylene (P1) by a solution polymerization process.

The monovalent substituting group is also advantageously a group which increases the fusibility of the polyarylene (P1), i.e. it lowers its glass transition temperature and its melt viscosity, so as to desirably make the polyarylene (P1) suitable for thermoprocessing.

Preferably, the monovalent substituting group is chosen from:
hydrocarbyls such as alkyls, aryls, alkylaryls and aralkyls;
halogenos such as —Cl, —Br, —F and —I;
hydrocarbyl groups partially or completely substituted by at least one halogen atom such as halogenoalkyls, halogenoaryls, halogenoalkylaryls and halogenoaralkyls;
hydroxyl;
hydrocarbyl groups substituted by at least one hydroxyl group, such as hydroxyalkyls, hydroxyaryls, hydroxyalkylaryls and hydroxyaralkyls;
hydrocarbyloxys [—O—R, where R is a hydrocarbyl group], such as alkoxys, aryloxys, alkylaryloxys and aralkyloxys;
amino (—NH$_2$);
hydrocarbyl groups substituted by at least one amino group, such as aminoalkyls and aminoaryls;
hydrocarbylamines [—NHR or —NR$_2$, where R is a hydrocarbyl group] such as alkylamines and arylamines;
carboxylic acids and their metal or ammonium salts, carboxylic acid halides, carboxylic anhydrides;
hydrocarbyl groups substituted by at least one of carboxylic acids, metals or ammonium salts thereof, carboxylic acid halides and carboxylic anhydrides, such as —R—C(=O)OH where R is an alkyl or an aryl group;
hydrocarbylesters [—C(=O)OR or —O—C(=O)R, where R is a hydrocarbyl group] such as alkylesters, arylesters, alkylarylesters and aralkylesters;
amido [—C(=O)NH$_2$];
hydrocarbyl groups substituted by at least one amido group;
hydrocarbylamide monoesters [—C(=O)NHR or —NH—C(=O)—R, where R is a hydrocarbyl group], such as alkylamides, arylamides, alkylarylamides and aralkylamides, and hydrocarbylamide diesters [—C(=O)NR$_2$ or —N—C(=O)R$_2$, where R are a hydrocarbyl groups], such as dialkylamides and diarylamides;
sulfinic acid (—SO$_2$H), sulfonic acid (—SO$_3$H), their metal or ammonium salts, hydrocarbylsulfones [—S(=O)$_2$—R, where R is the hydrocarbyl group], such as alkylsulfones, arylsulfones, alkylarylsulfones, aralkylsulfones;

aldehyde [—C(=O)H] and haloformyls [—C(=O)X, wherein X is a halogen atom];

hydrocarbylketones [—C(=O)—R, where R is a hydrocarbyl group], such as alkylketones, arylketones, alkylarylketones and aralkylketones;

hydrocarbyloxyhydrocarbylketones [—C(=O)—R'—O—R$^2$, where R$^1$ is a divalent hydrocarbon group such as an alkylene, an arylene, an alkylarylene or an aralkylene, preferably a $C_1$-$C_{18}$ alkylene, a phenylene, a phenylene group substituted by at least one alkyl group, or an alkylene group substituted by at least one phenyl group; and R$^2$ is a hydrocarbyl group, such as an alkyl, aryl, alkylaryl or aralkyl group], such as alkyloxyalkylketones, alkyloxyarylketones, alkyloxyalkylarylketones, alkyloxyaralkylketones, aryloxyalkylketones, aryloxyarylketones, aryloxyalkylarylketones and aryloxyaralkylketones;

any of the above groups comprising at least one hydrocarbyl group or a divalent hydrocarbon group R$^1$, wherein said hydrocarbyl group or said R$^1$ is itself substituted by at least one of the above listed monovalent substituting groups, e.g. an arylketone —C(=O)—R, where R is an aryl group substituted by one hydroxyl group;

where:
the hydrocarbyl groups contain preferably from 1 and 30 carbon atoms, more preferably from 1 to 12 carbon atoms and still more preferably from 1 to 6 carbon atoms;

the alkyl groups contain preferably from 1 to 18 carbon atoms, and more preferably from 1 to 6 carbon atoms; very preferably, they are chosen from methyl, ethyl, n-propyl, isopropyl, n-butyl, isobutyl and tert-butyl;

the aryl groups are defined as monovalent groups consisting of one end and one core composed of one benzenic ring (such the phenyl group) or of a plurality of benzenic rings directly linked to each other via a carbon-carbon linkage (such as the biphenyl group) or fused together by sharing two or more neighboring ring carbon atoms (such as the naphthyl groups), and wherein the ring carbon atoms are possibly substituted by at least one nitrogen, oxygen or sulfur atom; preferably, in the aryl groups, no ring carbon atom is substituted;

the aryl groups contain preferably from 6 to 30 carbon atoms; more preferably, they are phenyl groups;

the alkyl group which is contained in the alkylaryl groups meets the preferences of the alkyl groups as above expressed;

the aryl group which is contained in the aralkyl groups meets the preferences of the aryl groups as above expressed.

More preferably, the monovalent substituting group is chosen from hydrocarbylketones [—C(=O)—R, where R is a hydrocarbyl group] and hydrocarbyloxyhydrocarbylketones [—C(=O)—R'—O—R$^2$, where R$^1$ is a divalent hydrocarbon group and R$^2$ is a hydrocarbyl group], said hydrocarbylketones and hydrocarbyloxyhydrocarbylketones being unsubstituted or substituted by at least one of the above listed monovalent substituting groups.

Still more preferably, the monovalent substituting group is chosen from arylketones and aryloxyarylketones, said arylketones and aryloxyarylketones being unsubstituted or substituted by at least one of the above listed monovalent substituting groups.

The most preferably, the monovalent substituting group is an (unsubstituted) arylketone, in particular it is phenylketone [—C(=O)-phenyl].

The core of the optionally substituted arylene group of the recurring units (R1) is composed of preferably at most 3, more preferably at most 2, and still more preferably at most one benzenic ring. Then, when the core of the optionally substituted arylene group of the recurring units (R1) is composed of one benzenic ring, the recurring units (R1) are of one or more formulae consisting of an optionally substituted phenylene group, provided said optionally substituted phenylene group is linked by each of its two ends to two other optionally substituted arylene groups via a direct C—C linkage, and the polyarylene (P1) is called a polyphenylene. Then, the polyarylene (P1) is preferably a polyphenylene.

As above explained, the optionally substituted arylene group of the recurring units (R1) is linked by each of its two ends to two other optionally substituted arylene groups via a direct C—C linkage. Preferably, it is linked by each of its two ends to two other optionally substituted phenylene groups via a direct C—C linkage.

As also above explained, both ends of the optionally substituted arylene group of the recurring units (R1) can be characterized notably by a direction and by a sense.

A first set of recurring units suitable as recurring units (R1) is composed of optionally substituted arylene groups, the ends of which
have the same direction,
are of opposite sense, and
are in the straight foregoing of each other
[hereafter, recurring units (R1-a)].

Non limitative examples of such optionally substituted arylene groups include: 1,4-phenylene (also named p-phenylene); 1,4-naphthylene; 1,4- and 2,7-phenanthrylenes; 1,4-, and 9,10-anthrylenes; 2,7-pyrenylene; 1,4- and 5,12-naphthacenylenes; 1,4-chrysenylene; 1,4- and 2,7-triphenylylenes; 1,4-, 5,14- and 6,13-pentacenylenes; 1,6-coronenylene; 1,4-, 2,9- and 5,18-trinaphthylenylenes; and any of these groups substituted by at least one monovalent substituting group, as above defined, in particular by a phenylketone group.

Good results were obtained when recurring units (R1-a) are optionally substituted p-phenylenes.

Recurring units (R1-a), when contained in the polyarylene (P1), result in straight polymer chains exhibiting an outstanding rigidity. For this reason, such polyarylenes (P1) are commonly referred to as "rigid-rod polymers".

A second set of recurring units suitable as recurring (R1) is composed of optionally substituted arylene groups, the ends of which
either have a different direction, forming thus together an angle between 0 and 180°, said angle being possibly acute or obtuse,
or have the same direction and the same sense,
or have the same direction, are of opposite sense and are disjoint (i.e. not in the straight foregoing of each other)
[globally hereafter referred to as recurring units (R1-b)].

Then, a first subset of recurring units (R1-b) suitable as recurring units (R1) is composed of optionally substituted arylene groups, the ends of which have a different direction, forming together an acute angle [recurring units (R1-b1)]. Non limitative examples of optionally substituted arylene groups the ends of which have a direction different from each other, include: 1,2-phenylene (or o-phenylene); 1,2-, 2,3- and 1,7-naphthylenes; 1,2-, 1,8-, 1,9-, 2,3-, 2,5- and 2,10-phenanthrylenes; 1,2- and 1,7-anthrylenes; and any of these groups substituted by at least one monovalent substituting group, as above defined, in particular by a phenylketone group.

A second subset of recurring units (R1-b) suitable as recurring units (R1) is composed of optionally substituted arylene groups, the ends of which have a different direction, forming together an obtuse angle [recurring units (R1-b2)]. Non limitative examples of optionally substituted arylene groups the ends of which have a direction different from each other, include: 1,3-phenylene (or m-phenylene); 1,3- and 1,6-naphthylenes; 1,3-, 1,5-, 1,7-, 2,4-, 2,9- and 3,10-phenanthrylenes; 1,3- and 1,6-anthrylenes; and any of these groups substituted by at least one monovalent substituting group, as above defined, in particular by a phenylketone group.

A third subset of recurring units (R1-b) is composed of optionally substituted arylene groups, the ends of which have the same direction and the same sense [recurring units (R1-b3)]. Non limitative examples of optionally substituted arylene groups the ends of which the same direction and the same sense include: 1,8-naphthylene; 1,10- and 3,5-phenanthrylenes; 1,8- and 1,9-anthrylenes; and any of these groups substituted by at least one monovalent substituting group, as above defined, in particular by a phenylketone group.

A fourth subset of recurring units (R1-b) is composed of optionally substituted arylene groups, the ends of which have the same direction, are of opposite sense and are disjoint [recurring units (R1-b4)]. Non limitative examples of such optionally substituted arylene groups include: 1,5- and 2,6-naphthylenes; 1,6-, 3,9- and 4,10-phenanthrylenes; and 1,5-, 1,10- and 2,6-anthrylenes; and any of these groups substituted by at least one monovalent substituting group, as above defined, in particular by a phenylketone group.

Preferably, recurring units (R1-b) are chosen from recurring units (R1-b1), recurring units (R1-b2) and recurring units (R1-b4). More preferably, recurring units (R1-b) are chosen from recurring units (R1-b1) and recurring units (R1-b2). Still more preferably, recurring units (R1-b) are chosen from recurring units (R1-b1). Good results were obtained when recurring units (R1-b) are optionally substituted m-phenylenes.

Recurring units (R1-b), when contained in the polyarylene (P1), result in more or less kinked polymer chains, exhibiting a higher solubility and fusibility than straight polymer chains. For this reason, such polyarylenes (P1) are commonly referred to as "kinked polymers".

Recurring units (R1) are preferably chosen from:
recurring units (R1-a) which are substituted by at least one monovalent substituting group [choice (A)]; and
mixes of recurring units (R1-a), which can be substituted or not by at least one monovalent substituting group, with recurring units (R1-b), which can be substituted or not by at least one monovalent substituting group [choice (B)].

Choice (B) is generally more preferred than choice A.
Choice (A)

Recurring units of choice (A) are recurring units (R1-a) which are substituted by at least one monovalent substituting group.

Said recurring units are preferably p-phenylenes substituted by at least one monovalent substituting group.

Very preferably, they are p-phenylenes substituted by at least one monovalent substituting group chosen from hydrocarbylketones [—C(=O)—R, where R is a hydrocarbyl group] and hydrocarbyloxyhydrocarbylketones [—C(=O)—R$^I$—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed.

Still more preferably, they are p-phenylenes substituted by at least one monovalent substituting group chosen from arylketones and aryloxyarylketones, said arylketones and aryloxyarylketones being unsubstituted or substituted by at least one monovalent substituting group as those above listed.

The most preferably, they are p-phenylenes substituted by an arylketone group, in particular by the phenylketone group.
Choice (B)

Recurring units of choice (B) are a mix of recurring units (R1-a), which can be substituted or not by at least one monovalent substituting group, with recurring units (R1-b), which can be substituted or not by at least one monovalent substituting group. When such a mix of recurring units is contained in the polyarylene (P1), said polyarylene (P1) is commonly referred to as "a kinked rigid-rod polymer".

The recurring units of choice (B) are preferably a mix (MB) of recurring units (R1-a) chosen from optionally substituted p-phenylenes, with recurring units (R1-b) chosen from (i) optionally substituted m-phenylenes and (ii) mixes of optionally substituted m-phenylenes with optionally substituted o-phenylenes.

The recurring units (R1-a) of the mix (MB) are preferably p-phenylene units substituted by at least one substituting group. More preferably, the recurring units (R1-a) of the mix (MB) are p-phenylenes substituted by at least one monovalent substituting group chosen from hydrocarbylketones [—C(=O)—R, where R is a hydrocarbyl group] and hydrocarbyloxyhydrocarbylketones [—C(=O)—R$^I$—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed. Still more preferably, the recurring units (R1-a) of the mix (MB) are p-phenylenes substituted by at least one monovalent substituting group chosen from arylketones and aryloxyarylketones, said arylketones and aryloxyarylketones being unsubstituted or substituted by at least one monovalent substituting group as those above listed. The most preferably, they are p-phenylenes substituted by an arylketone group, in particular by the phenylketone group.

Essentially all, if not all, the recurring units (R1-b) of the mix (MB) are m-phenylene units optionally substituted by at least one substituting group. More preferably, essentially all, if not all, the recurring units (R1-b) of the mix (MB) are m-phenylene units which are optionally substituted by at least one monovalent substituting group chosen from hydrocarbylketones [—C(=O)—R, where R is a hydrocarbyl group] and hydrocarbyloxyhydrocarbylketones [—C(=O)—R'—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed. Still more preferably, essentially all, if not all, the recurring units (R1-b) of the mix (MB) are unsubstituted m-phenylene units. The most preferably, all the recurring units (R1-b) are m-phenylene units.

In the mix (MB), the mole ratio of the recurring units (R1-b), based on the total number of moles of the recurring units (R1-a) and (R1-b), is usually of at least 1%, preferably at least 5%, more preferably at least 20%, still more preferably at least 30% and the most preferably at least 40%. On the other hand, in the mix (MB), the mole ratio of the recurring units (R1-b), based on the total number of moles of the recurring units (R1-a) and (R1-b), is usually of at most 99%, preferably at most 95%, more preferably at most 80%, still more preferably at most 70% and the most preferably at most 60%.

Good results were obtained when the recurring units of option (B) were a mix of p-phenylene substituted by a phenylketone group with unsubstituted m-phenylene, in a mole ratio of about 50:50.

The polyarylene (P1) may be notably a homopolymer, a random, alternating or block copolymer.

Optionally, the polyarylene (P1) may further comprise recurring units (R1*), different from recurring units (R1).

Recurring units (R1*) may contain or not at least one strong divalent electron withdrawing group linked on each of its ends to an arylene group. Non limitative examples of recurring units (R1*) free of such strong divalent electron withdrawing group are:

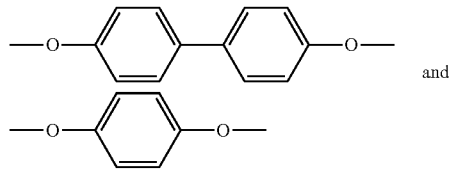
and

Recurring units (R1*) contain preferably at least one strong divalent electron withdrawing group linked on each of its ends to an arylene group, in particular a p-phenylene group. The divalent electron withdrawing group is preferably chosen from the sulfone group [—S(=O)$_2$—], the carbonyl group [—C(=O)—], the vinylene group [—CH=CH—], the sulfoxide group [—S(=O)—], the azo group [—N=N—], saturated fluorocarbon groups like —C(CF$_3$)$_2$—, organic phosphine oxide groups [—P(=O)(=R$_h$)—, where R$_h$ is a hydrocarbyl group] and the ethylidene group [—C(=CA$_2$)—, where A can be hydrogen or halogen]. More preferably, the divalent electron withdrawing group is chosen from the sulfone group and the carbonyl group. Still more preferably, recurring units (R1*) are chosen from:

(i) recurring units of formula

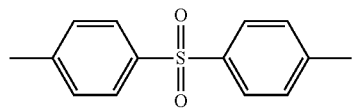

(ii) recurring units of formula

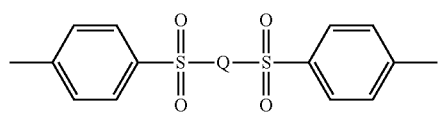

[hereinafter, formula (K)] wherein Q is a group chosen from

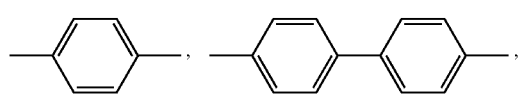

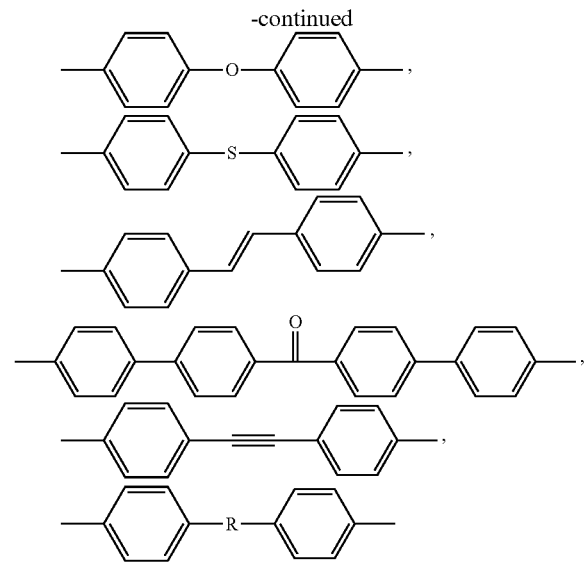

With R being:

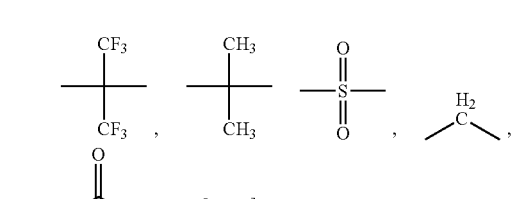

—(CH$_2$)$_{n'}$—, with n being an integer from 1 to 6 and n' being an integer from 2 to 6, Q being preferably chosen from

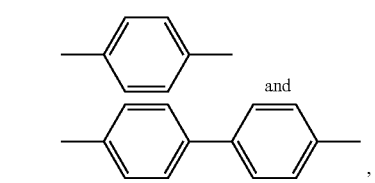

(iii) recurring units of formula

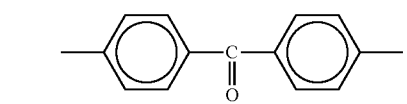

(iv) recurring units of formula (K'), said recurring units being identical to the above recurring units of formula (K), except that, in formula (K) itself, both sulfone groups have been replaced by carbonyl groups.

Preferably more than 50 wt., and more preferably more than 90 wt. % of the recurring units of the polyarylene (P1) are recurring units (R1). The most preferably, essentially all, if not all, the recurring units of the polyarylene (P1) are recurring units (R1).

Excellent results were obtained when the polyarylene (P1) was a polyphenylene copolymer, essentially all, if not all, the recurring units of which consisted of a mix of p-phenylene substituted by a phenylketone group with unsubstituted m-phenylene in a mole ratio p-phenylene:m-phenylene of from 5:95 to 95:5, preferably of from 70:30 to 30:70, more preferably of from 60:40 to 40:60, and still more preferably of about 50:50. Such a polyphenylene copolymer is commercially available from Solvay Advanced Polymers, L.L.C. as PRIMOSPIRE® PR-250 polyphenylene.

The polyarylene (P1) has a number average molecular weight of advantageously greater than 500 and, by increasing order of preference, greater than 1000, 2000, 3000, 5000, 10000 and 15000. On the other hand, the number average molecular weight of the polyarylene (P1) is usually below 100000, and preferably below 70000. In a certain embodiment, the number average molecular weight of the polyarylene (P1) is above 35000. In another embodiment, it is of at most 35000; in this embodiment, it is often of at most 25000 and sometimes of at most 20000. The number average molecular weight of a polyarylene, in particular that of the polyarylene (P1), is advantageously determined by: (1) measuring a "relative" number average molecular weight of the polyarylene by Gel Permeation Chromatography (GPC) using polystyrene calibration standards, then (2) dividing the so-measured "relative" number average molecular weight by a factor 2. It is proceeded accordingly because the skilled in the art, who is a specialist of polyarylenes, knows that their "relative" number average molecular weight, as measured by GPC, are generally off by a factor of about 2 times; it has already been accounted for this correction factor in all the above cited lower and upper limits of molecular weight.

The polyarylene (P1) can be amorphous (i.e. it has no melting point) or semi-crystalline (i.e. it has a melting point). It is preferably amorphous.

The polyarylene (P1) has a glass transition temperature of advantageously above 50° C., preferably above 120° C. and more preferably above 150° C.

The polyarylene (P1) can be prepared by any method. Methods well known in the art to prepare the polyarylene (P1) are described notably in U.S. Pat. Nos. 5,227,457; 5,539,048; 5,565,543; 5,646,231; 5,654,392; 5,659,005; 5,668,245; 5,670,564; 5,721,335; 5,756,581; 5,760,131; 5,824,744; 5,827,927; 5,869,592; 5,886,130; and 6,087,467, the whole content of which is incorporated herein by reference. A suitable method for preparing the polyarylene (P1) comprises polymerizing, preferably by reductive coupling, at least one dihaloarylene molecular compound consisting of one optionally substituted arylene group, which is linked on each of its two ends to one halogen atom, such as chlorine, bromine, iodine. The elimination of both halogen atoms from a dihaloarylene molecular compound results in the formation of an optionally substituted arylene group, suitable as a recurring unit (R1) of the polyarylene (P1).

Thus, for example:
the elimination of both chlorine atoms from one molecule of p-dichlorobenzene, p-dichlorobiphenyl and their homologous of general formula Cl-$(\phi)_N$-Cl, N being an integer from 3 to 10, results in the formation of respectively 1, 2 or N adjacent p-phenylene units; thus, p-dichlorobenzene, p-dichlorobiphenyl and their homologous of general formula Cl-$(\phi)_N$-Cl, N as above defined, can be polymerized, so as to form p-phenylene units;

2,5-dichlorobenzophenone (p-dichlorobenzophenone) can be polymerized, so as to form 1,4-(benzoylphenylene) units;

2,5-dichloro-4'-phenoxybenzophenone can be polymerized, so as to form 1,4-(4'-phenoxybenzoylphenylene) units;

m-dichlorobenzene can be polymerized, so as to form m-phenylene units.

The blend (B) can comprise one and only one polyarylene (P1). Alternatively, it can comprise two, three, or even more than three polyarylenes (P1).

In the blend (B), the polyarylene (P1) can be in any form, except fibers. More generally, the blend (B) is usually free of any polyarylene in the form of fibers.

Preferably, the polyarylene (P1) is in at least one out of the two following forms:
polyarylene (P1) solubilized in a phase comprising poly(aryl ether ketone) (P2), possibly the matrix phase of the blend (B);
polyarylene (P1) forming a dispersing phase, possibly the matrix phase of the blend (B), said dispersing phase comprising, dispersed therein, poly(aryl ether ketone) (P2) at solubilized state;

and, possibly in addition, in one or more of the following forms:
nodules of polyarylene (P1) dispersed in a phase comprising poly(aryl ether ketone) (P2), possibly the matrix phase of the blend (B);
polyarylene (P1) forming a dispersing phase, possibly the matrix phase of the blend (B), said dispersing phase comprising, dispersed therein, nodules of poly(aryl ether ketone) (P2).

Very preferably, the polyarylene (P1) is in the form of:
polyarylene (P1) solubilized in a phase comprising poly(aryl ether ketone) (P2), possibly the matrix phase of the blend (B);

and, possibly in addition, in the form of:
nodules of polyarylene (P1) dispersed in a phase comprising poly(aryl ether ketone) (P2), possibly the matrix phase of the blend (B);

wherein:
certain nodules of polyarylene (P1) may be free of poly(aryl ether ketone) (P2), and
certain other nodules of polyarylene (P1) may form themselves a dispersing phase, other than the matrix phase, comprising, dispersed therein, poly(aryl ether ketone) (P2) at solubilized state and/or in the form of sub-nodules.

The Poly(Aryl Ether Ketone) (P2)

As previously mentioned, the blend (B) comprises at least one poly(aryl ether ketone) (P2).

For the purpose of the present invention, the term "poly(aryl ether ketone)" is intended to denote any polymer of which more than 50 wt. % of the recurring units are recurring units (R2) comprising at least one carbonyl group in-between two arylene groups, said recurring units (R2) being of one or more of the following formulae:

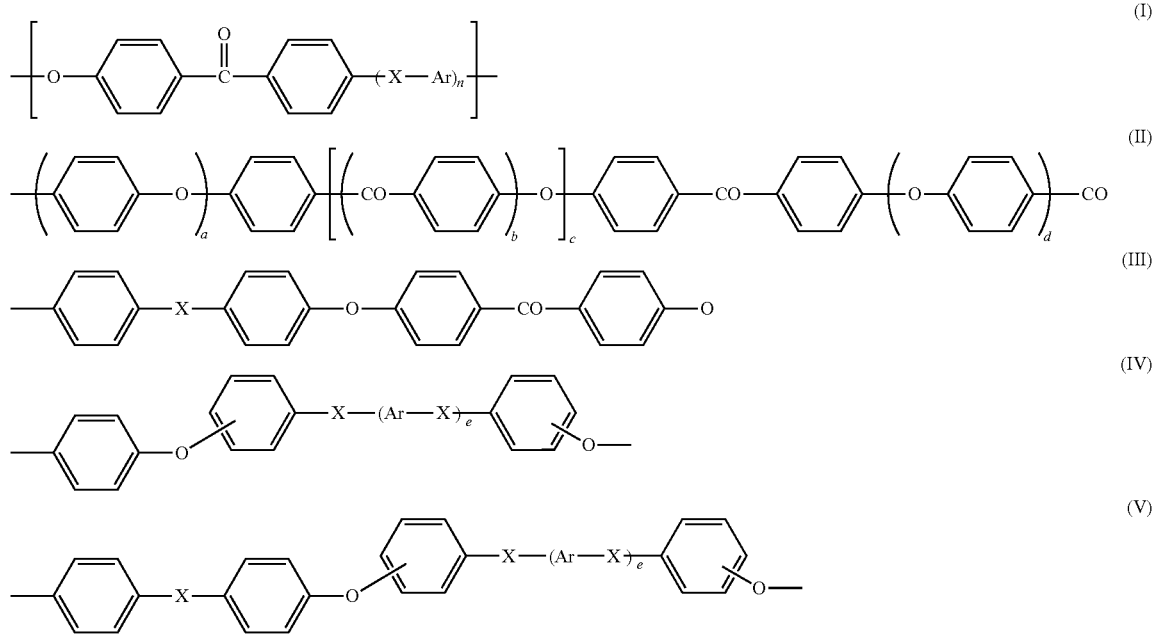
wherein:
  Ar is independently a divalent aromatic radical selected from phenylene, biphenylene or naphthylene,
  X is independently O, C(=O) or a direct bond,
  n is an integer of from 0 to 3,
  b, c, d and e are 0 or 1,
  a is an integer of 1 to 4, and
  preferably, d is 0 when b is 1.
Recurring units (R2) may notably be chosen from:
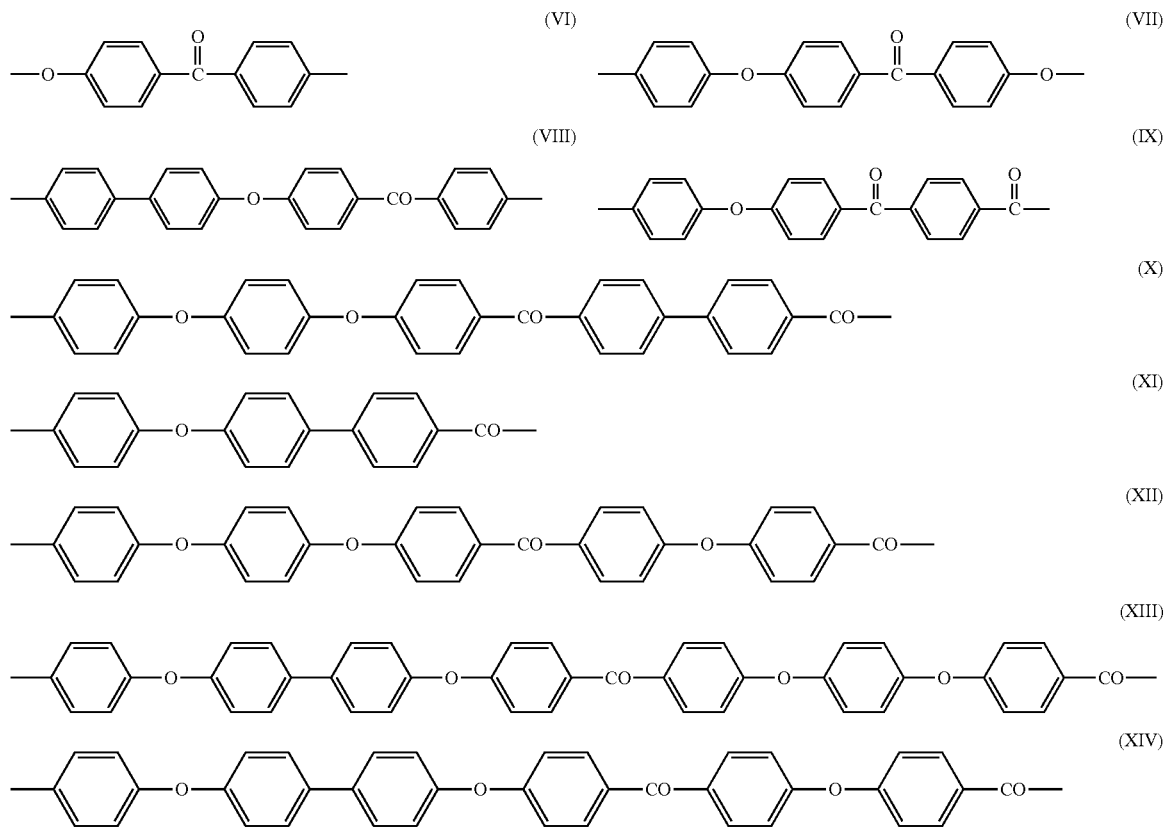

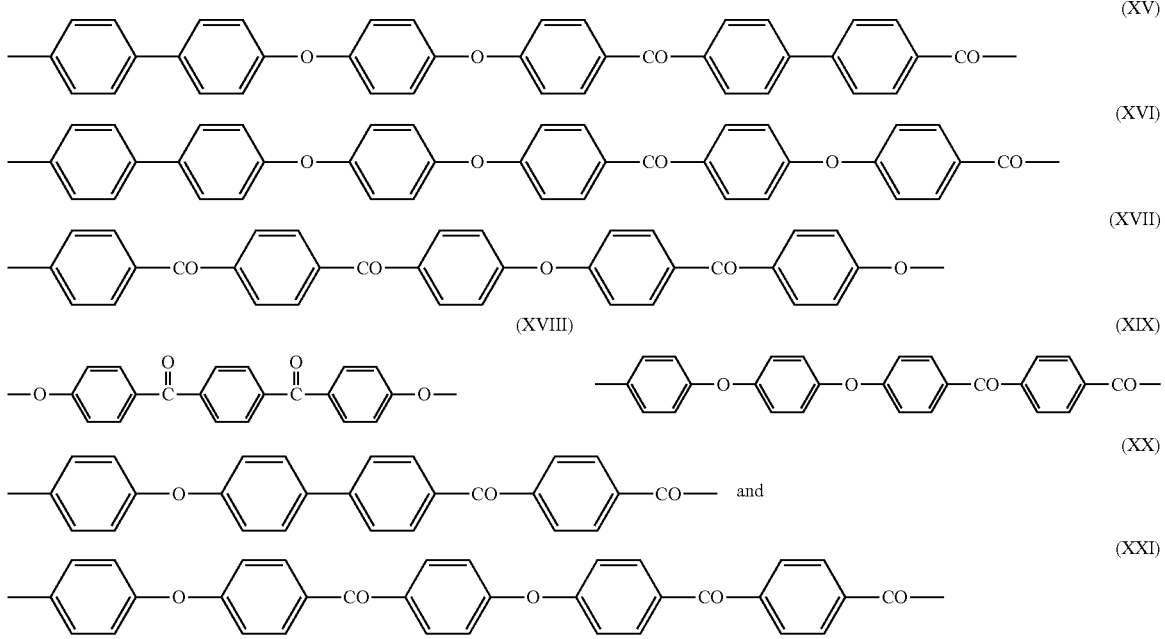

Preferably, recurring (R2) are chosen from:

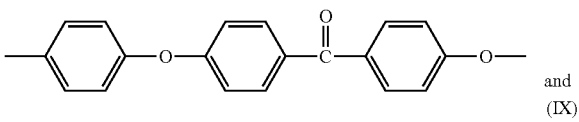

More preferably, recurring units (R2) are:

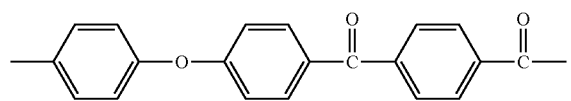

For the purpose of the present invention, a polyetheretherketone is intended to denote any polymer of which more than 50 wt. % of the recurring units are recurring units (R2) of formula (VII).

The poly(aryl ether ketone) (P2) may further comprise recurring units (R2*) other than recurring units (R2). Non limitative example of such recurring units include (i) arylethersulfone units comprising containing at least one arylene group, at least one ether group (—O—) and at least one sulfone group [—S(=O)$_2$—], and arylcarbonate units containing at least one arylene group and at least one carbonate group (—O—C(=O)—O—).

Yet, preferably more than 70 wt. %, and more preferably more than 85 wt. % of the recurring units of the poly(aryl ether ketone) (P2) are recurring units (R2). Still more preferably, essentially all the recurring units of the poly(aryl ether ketone) (P2) are recurring units (R2). The most preferably, all the recurring units of the poly(aryl ether ketone) (P2) are recurring units (R2).

Excellent results were obtained when the poly(aryl ether ketone) (P2) is a polyetheretherketone homopolymer, i.e. a polymer of which essentially all, if not all, the recurring units are of formula (VII). VICTREX® 150 P and VICTREX® 450 P PEEKs from Victrex Manufacturing Ltd., and KETASPIRE® and GATONE® PEEKs from Solvay Advanced Polymers, L.L.C. are examples of polyetheretherketone homopolymers.

The poly(aryl ether ketone) (P2) has advantageously a reduced viscosity (RV) of at least 0.60 dl/g, as measured in 95-98% sulfuric acid (d=1.84 g/ml) at a poly(aryl ether ketone) concentration of 1 g/100 ml. The measurement is performed using a No 50 Cannon-Fleske viscometer. RV is measured at 25° C. in a time less than 4 hours after dissolution, to limit sulfonation. The RV of the poly(aryl ether ketone) (P2) is preferably of at least 0.65 dl/g, more preferably of 0.70 dl/g. Besides, the RV of the poly(aryl ether ketone) (P2) is advantageously of at most 1.20 dl/g, preferably at most 1.10 and still more preferably at most 1.00 dl/g.

The poly(aryl ether ketone) (P2) can be amorphous (i.e. it has no melting point) or semi-crystalline (i.e. it has a melting point). It is usually semi-crystalline; the case being, the melting point of the poly(aryl ether ketone) (P2) is advantageously greater than 150° C., preferably greater than 250° C., more preferably greater than 300° C. and still more preferably greater than 325° C.

The poly(aryl ketone) (P2) can be prepared by any method. One well known in the art method contains reacting a substantially equimolar mixture of at least one bisphenol and at least one dihalobenzoid compound or at least one halophenol compound as described in Canadian Pat. No. 847,963. Non limitative example of bisphenols useful in such a process are hydroquinone, 4,4'-dihydroxybiphenyl and 4,4'-dihydroxybenzophenone; non limitative examples of dihalobenzoid compounds useful in such a process are 4,4'-difluorobenzophenone, 4,4'-dichlorobenzophenone and 4-chloro-4'-fluorobenzophenone; non limitative examples of halophenols compounds useful in such a process are 4-(4-chlorobenzoyl)phenol and (4-fluorobenzoyl)phenol. Accordingly, PEEK homopolymers may notably be produced by the nucleophilic process as described in, for example, U.S. Pat. No. 4,176,222, the whole content of which is herein incorporated by reference.

Another well known in the art method to produce PEEK homopolymers comprises electrophilically polymerizing phenoxyphenoxybenzoic acid, using an alkane sulfonic acid as solvent and in the presence of a condensing agent, as the process described in U.S. Pat. No. 6,566,484, the whole content of which is herein incorporated by reference. Other poly(aryl ether ketone)s may be produced by the same method, starting from other monomers than phenoxyphenoxybenzoic acid, such as those described in U.S. Pat. Appl. 2003/0130476, the whole content of which is also herein incorporated by reference.

The blend (B) can comprise one and only one poly(aryl ether ketone) (P2). Alternatively, it can comprise two, three, or even more than three poly(aryl ether ketone)s (P2). Certain preferred mixes of poly(aryl ether ketone)s (P2) are: mixes consisting of (i) at least one poly(aryl ether ketone) (P2a) of which more than 50 wt. % of the recurring units, preferably essentially all the recurring units, and still more preferably all the recurring units are of formula

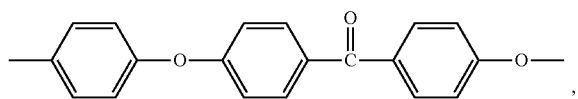
(VII)

with (ii) at least one poly(aryl ether ketone) (P2b) of which more than 50 wt. % of the recurring units, preferably essentially all the recurring units, and still more preferably all the recurring units are of formula

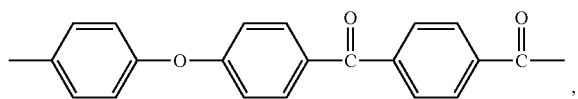
(IX)

and, optionally in addition, with (iii) at least one other poly(aryl ether ketone) (P2c) different from poly(aryl ether ketone)s (P2a) and (P2b);
in particular, mixes consisting of (i) at least one poly(aryl ether ketone) (P2a) of which essentially all, if not all, the recurring units are of formula (VII) with (ii) at least one poly(aryl ether ketone) (P2b) of which essentially all, if not all, the recurring units are of formula (IX);
still more particularly, binary mixes consisting of (i) one poly(aryl ether ketone) (P2a) of which all the recurring units are of formula (VII) with (ii) one poly(aryl ether ketone) (P2b) of which all the recurring units are of formula (IX).

Embodiment (E*)

In a particular embodiment of the present invention (E*), the poly(aryl ether ketone) (P2) is a poly(aryl ether sulfone), namely a polymer of which at least 5 wt. % of the recurring units are recurring units of one or more formulae comprising at least one arylene group, at least one ether group (—O—) and at least one sulfone group [—S(=O)$_2$—].

In embodiment (E*), the poly(aryl ether ketone) (P2) may comprise: (i) repeating units (PhSO$_2$Ph)$_n$ linked through ether and/or thioether, where n is 1 to 3 or can be fractional in this range, and (ii) structural units (Ph)$_k$ so linked, wherein Ph is phenylene (especially para-phenylene), "k" is 1 to 3 or can be fractional within this range, and at least part of such phenylenes are linked linearly through a divalent —CO— group, the remaining part of such phenylenes, if any, being fused together or are linked through a single chemical bond or a divalent group other than SO$_2$ and —CO—.

By "fractional" reference is made to the average value for a given polymer chain containing units having various values of "n" or "k".

In embodiment (E*), the polyarylene (P1) may meet all the characteristics of the polyphenylenes described in PCT/EP2006/060535, as long as they are compatible with those of the polyarylene (P1) described in the present document.

The person skilled in the art will understand that the invention is not intended to be limited to this particular embodiment (E*), but encompasses also any embodiment other than (E*) which is described in the present document. Besides, various modifications to the embodiments described in the present document will be readily apparent to those skilled in the art, and the generic principles defined herein may be applied to other embodiments without departing from the spirit and scope of the invention; thus, this invention is also not intended to be limited to all the embodiments shown, but is to be accorded the widest scope consistent with the principles and features disclosed herein.

Optional Ingredients of the Blend (B)

The blend (B) may further contain a variety of polymers other than (P1) and (P2), additives, fillers, and the like, collectively called ingredients. Conventional ingredients of polyarylene and poly(aryl ether ketone) compositions, include fibrous reinforcing agents, particulate fillers and nucleating agents such as talc and silica, adhesion promoters, compatibilizers, curing agents, lubricants, metal particles, mold release agents, organic and/or inorganic pigments like TiO$_2$ and carbon black, dyes, flame retardants, smoke-suppressing agents, heat stabilizers, antioxidants, UV absorbers, tougheners such as rubbers, plasticizers, anti-static agents, melt viscosity depressants such as liquid crystalline polymers and the like.

The weight of said optional ingredients, based on the total weight of the blend (B), is advantageously below 75%, preferably below 50%, more preferably below 25% and still more preferably below 10%. Good results were obtained when the blend (B) was essentially free, or even was completely free, of said optional ingredients.

In particular, the blend (B) may further contain a fibrous reinforcing agent, in particular an inorganic fibrous reinforcing agent such as glass fiber and carbon fiber. Thus, in a certain particular non preferred embodiment, the blend (B) comprises from 10 to 50 wt. %, in particular from 20 to 30 wt. %, of a reinforcing agent (all percentages based on the total weight of the blend); an example of such a blend is one composed of 35 wt. % of a kinked rigid-rod polyphenylene homopolymer, 35 wt. % of a polyetheretherketone homopolymer and 30 wt. % of glass fiber. On the other hand, preference is given to a blend (B) wherein the weight of fibrous reinforcing agent, based on the total weight of the blend (B), is below 10% and preferably below 5%, and excellent results were obtained when the blend (B) was essentially free, or even was completely free, of any fibrous reinforcing agent.

Embodiment (E**)

Blend (T)

In an especially valuable embodiment of the present invention, at least one polyarylene, at least one poly(aryl ether ketone) and at least one poly(aryl ether sulfone) are contained in a same blend. The Applicant has surprisingly found that the additional presence of a poly(aryl ether sulfone) in a blend comprising a polyarylene and a poly(aryl ether ketone), such as the above described blend (B), resulted in a blend (T) having several substantially improved properties when compared to the blend (B), while maintaining all its beneficial properties at a high level. Among the improved properties, the elongation at break and the impact resistance are dramatically increased. Also, the poly(aryl ether sulfone) act as a compatibilizer, by further increasing the unexpectedly intrinsically good compatibility of the polyarylene and the poly(aryl ether ketone), and providing blends of improved morphology, wherein the polyarylene and the poly(aryl ether ketone) domain sizes are substantially finer than absent the poly(aryl ether sulfone).

The blend (B) as previously described and further containing at least one poly(aryl ether sulfone) (P3) is a blend in accordance with embodiment (E**) of the present invention, said blend (B) comprising then:
- at least one polyarylene (P1) in a form other than fibers,
- at least one poly(aryl ether ketone) (P2), and
- at least one poly(aryl ether sulfone) (P3).

Another blend in accordance with embodiment (E**) comprises:
- polyarylene fibers,
- at least one poly(aryl ether ketone) (P2), and
- at least one poly(aryl ether sulfone) (P3).

Taken as a whole, the embodiment (E**) is thus directed to a blend (T) comprising:
- at least one polyarylene (P1$^+$),
- at least one poly(aryl ether ketone) (P2), and
- at least one poly(aryl ether sulfone) (P3).

The polyarylene (P1$^+$) may be in any form. The polyarylene (P1$^+$) may consist of fibers, or it may be in a form other than fibers. Preferably, the polyarylene (P1$^+$) is in a form other than fibers, like the polyarylene (P1).

Unless otherwise specified, the polyarylene (P1$^+$) complies preferably with all the preferred characteristics of the polyarylene (P1), i.e., among other preferences, the polyarylene (P1$^+$) is preferably a polyphenylene, and excellent results were obtained when the polyarylene (P1$^+$) was a polyphenylene copolymer, essentially all, if not all, the recurring units of which consisted of a mix of p-phenylene substituted by a phenylketone group with unsubstituted m-phenylene in a mole ratio p-phenylene:m-phenylene of from 5:95 to 95:5, preferably of from 70:30 to 30:70, more preferably of from 60:40 to 40:60, and still more preferably of about 50:50.

For the avoidance of doubt, the poly(aryl ether ketone) (P2) of the blend (T) is the exactly the same poly(aryl ether ketone) as the poly(aryl ether ketone) (P2) as above described, as an ingredient of the blend (B).

In the blend (T), the weight of the polyarylene (P1$^+$), based on the total weight of the polyarylene (P1$^+$) and the poly(aryl ether ketone) (P2), is advantageously of at least 15%, preferably at least 30% and more preferably at least 40%; it may be of at least 45% or of at least 55%. On the other hand, the weight of the polyarylene (P1$^+$), based on the total weight of the polyarylene (P1$^+$) and the poly(aryl ether ketone) (P2), is advantageously of at most 90%, preferably at most 80%, and more preferably at most 70%.

In the blend (T), the poly(aryl ether sulfone) (P3) over polyarylene (P1$^+$) weight ratio may vary to a large extent, depending on the encompassed end use. It may be notably of at least 0.01, 0.02, 0.05, 0.10, 0.20, 0.50, 1, 2 or 5 or 10. It may be notably of at most 10, 5, 2, 1 or 0.50. Notably when the poly(aryl ether sulfone) (P3) is used for the purpose of compatibilizing the polyarylene (P1$^+$) with the poly(aryl ether ketone) (P2), the poly(aryl ether sulfone) (P3) over polyarylene (P1$^+$) weight ratio is advantageously of at least 0.05, preferably at least 0.10, and more preferably at least 0.15; on the other hand, the poly(aryl ether sulfone) (P3) over polyarylene (P1$^+$) weight ratio is advantageously of at most 1, preferably at most 0.50, and more preferably at most 0.30.

Likewise, in the blend (T), the poly(aryl ether sulfone) (P3) over poly(aryl ether ketone) (P2) weight ratio may vary to a large extent, depending on the encompassed end use. It may be notably of at least 0.01, 0.02, 0.05, 0.10, 0.20, 0.50, 1, 2 or 5 or 10. It may be notably of at most 10, 5, 2, 1 or 0.50. Notably when the poly(aryl ether sulfone) (P3) is used for the purpose of compatibilizing the polyarylene (P1$^+$) with the poly(aryl ether ketone) (P2), the poly(aryl ether sulfone) (P3) over poly(aryl ether ketone) (P2) weight ratio is advantageously of at least 0.05, preferably at least 0.10, and more preferably at least 0.15; on the other hand, it is advantageously of at most 1, preferably at most 0.50, and more preferably at most 0.30.

In the blend (T), the total weight of the polyarylene (P1$^+$), of the poly(aryl ether ketone) (P2) and of the poly(aryl ether sulfone) (P3), based on the total weight of the blend (T), is advantageously above 25%, preferably above 50%, more preferably above 80% and still more preferably above 95%. Excellent results were obtained when the blend (T) consisted essentially of, or even consisted of, the polyarylene (P1$^+$), the poly(aryl ether ketone) (P2) and the poly(aryl ether sulfone) (P3).

In the blend (T), the weight of the polyarylene (P1$^+$), based on the total weight of the blend (T), is advantageously of at least 15%, preferably at least 25%, more preferably at least 35%; it may be of at least 40% or at least 50%. On the other hand, the weight of the polyarylene (P1), based on the total weight of the blend (T), is advantageously of at most 85%, preferably at most 75%, more preferably at most 65%, and still more preferably at most 60%; it may be of at most 50% or at most 40%.

In the blend (T), the weight of the poly(aryl ether ketone) (P2), based on the total weight of the blend (T), is advantageously of at least 15%, preferably at least 25%, more preferably at least 35%; it may be of at least 40% or at least 50%. On the other hand, the weight of the poly(aryl ether ketone) (P2), based on the total weight of the blend (T), is advantageously of at most 85%, preferably at most 75%, more preferably at most 65%, and still more preferably at most 60%; it may be of at most 50% or at most 40%.

In the blend (T), the weight of the poly(aryl ether sulfone) (P3), based on the total weight of the blend (T), may vary to a large extent, for the same reasons as those above explained. It may be of at least 1%, 2%, 5%, 10%, 20%, 40% or 60%; it may be of at most 70%, 50%, 40%, 30%, 20%, 15% or 10%. Notably when the poly(aryl ether sulfone) (P3) is used as compatibilizer, its weight, based on the total weight of the blend (T), is advantageously of at least 1%, preferably at least 2%, more preferably at least 5%, and still more preferably at least 8%; on the other hand, the weight of the poly(aryl ether sulfone) (P3), based on the total weight of the blend (T), is advantageously of at most 45%, preferably at most 35%, more preferably at most 18%, and still more preferably at most 12%, based on the total weight of the blend (T).

The Poly(Aryl Ether Sulfone) (P3)

For the purpose of the invention, a poly(aryl ether sulfone) is intended to denote any polymer, generally a polycondensate, of which more than 50 wt. % of the recurring units are recurring units (R3) of one or more formulae containing at least one arylene group, at least one ether group (—O—) and at least one sulfone group [—S(═O)$_2$—]. The poly(aryl ether sulfone) (P3) differs generally from the polyarylene (P1$^+$) and the poly(aryl ether ketone) (P2).

Non limitative examples of poly(aryl ether sulfone)s are polymers of which more than 50 wt. %, up to 100 wt. %, of the recurring units are recurring units (R3) of formula (1) and/or (2):

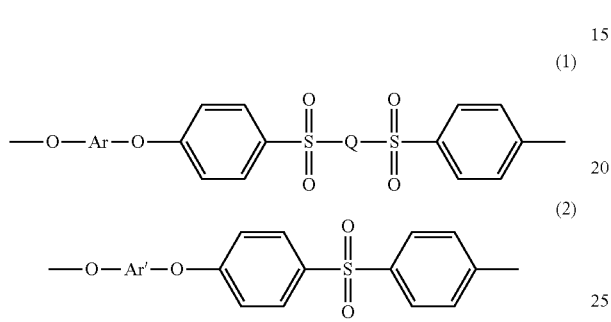

wherein:
Q is a group chosen among the following structures:

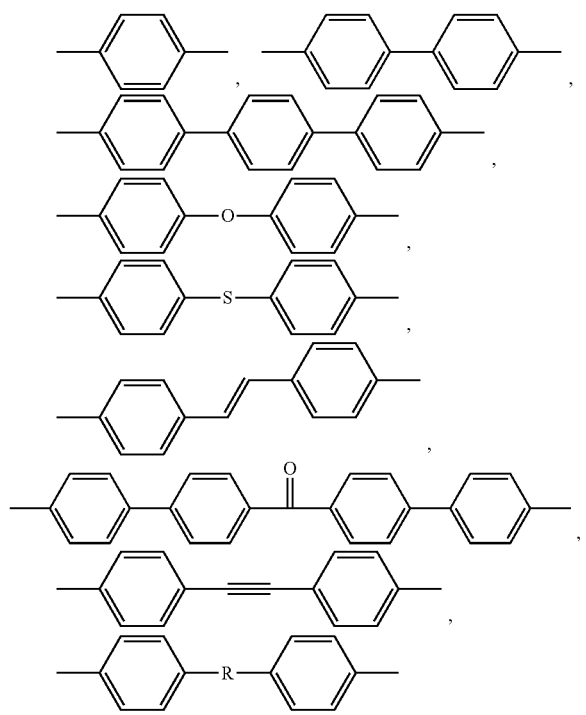

with R being:

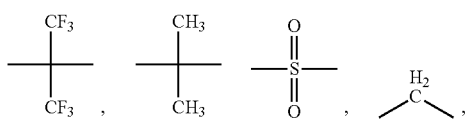

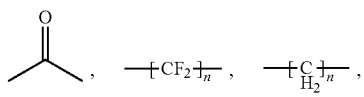

with n=integer from 1 to 6, or an aliphatic divalent group, linear or branched, of up to 6 carbon atoms;
and mixtures thereof;
Ar is a group chosen among the following structures:

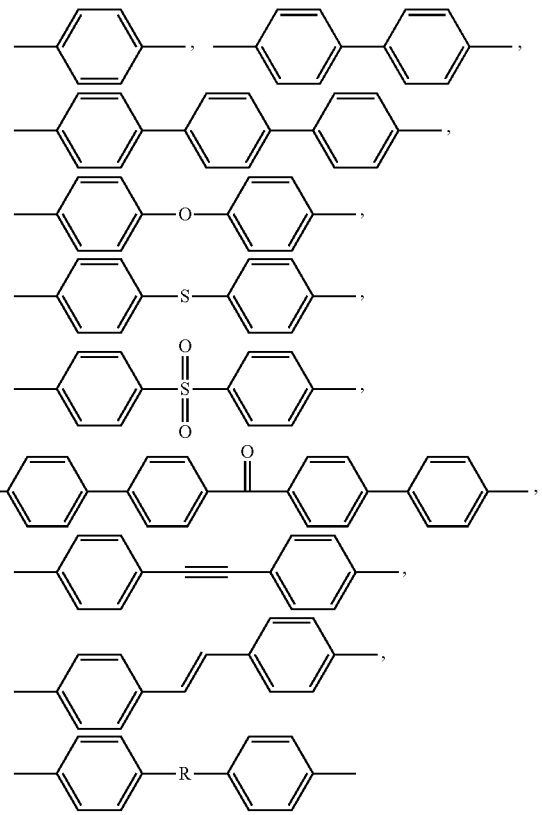

with R being:

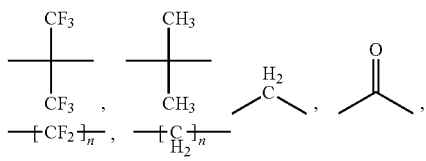

with n=integer from 1 to 6, or an aliphatic divalent group, linear or branched, of up to 6 carbon atoms;
and mixtures thereof;
Ar' is a group chosen among the following structures:

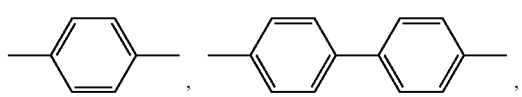

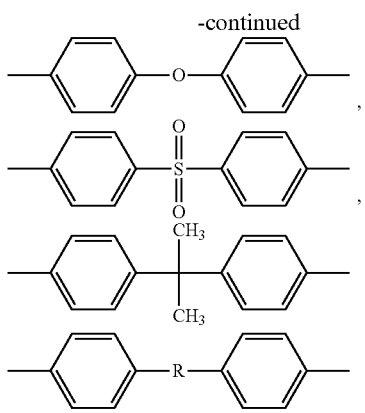

with R being:

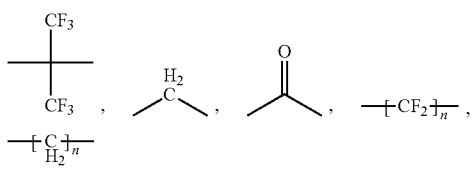

with n=integer from 1 to 6, or an aliphatic divalent group, linear or branched, of up to 6 carbon atoms; and mixtures thereof.

Among such polymers, it can be particularly cited the polymers of which more than 50 wt. %, up to 100 wt. %, of the recurring units are recurring units of one or more of formulae (3), (4), (5) and (6):

(3)

—O—⬡—⬡—O—⬡—S(=O)₂—⬡—

(4)

—O—⬡—O—⬡—S(=O)₂—⬡—

(5)

—O—⬡—S(=O)₂—⬡—O—⬡—S(=O)₂—⬡—

(6)

—O—⬡—C(CH₃)₂—⬡—O—⬡—S(=O)₂—⬡—

Polymers comprising more than 50 wt. % of recurring units of formula (3) are commonly known as "polyphenylsulfones" (PPSU) and are commercially available notably from SOLVAY ADVANCED POLYMERS, L.L.C. as RADEL® R poly(aryl ether sulfone)s.

Polymers comprising more than 50 wt. % of recurring units of formula (4) are commonly known as "polyetherethersulfones".

Polymers comprising more than 50 wt. % of recurring units of formula (5) are commonly known as polyethersulfones and are commercially available notably from SOLVAY ADVANCED POLYMERS, L.L.C. as RADEL® A poly(aryl ether sulfone)s.

Polymers comprising more than 50 wt. % of recurring units of formula (6) are commonly known as "bisphenol A polysulfones" (or just "polysulfones") and are commercially available notably from SOLVAY ADVANCED POLYMERS, L.L.C. as UDEL® poly(aryl ether sulfone)s.

The blend (T) may contain one and only one poly(aryl ether sulfone) (P3). Alternatively, the blend (T) may contain two or more one poly(aryl ether sulfone)s (P3); for example, it may contain at least one polyphenylsulfone and at least one polysulfone, or it may contain at least one polyphenylsulfone and at least one polyethersulfone.

Preferably, the recurring units (R3), as above defined, contain at least one p-biphenylene group

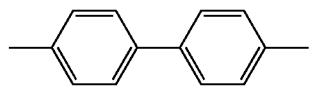

as the at least one arylene group. The case being, the poly(aryl ether sulfone) is commonly known as a poly(biphenyl ether sulfone). For the purpose of the present invention, a poly(biphenyl ether sulfone) is intended to denote any polymer, generally a polycondensate, of which more than 50 wt. % of the recurring units are recurring units (R3) of one or more formulae containing at least one p-biphenylene group:

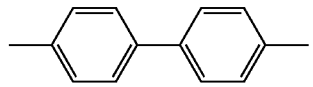

at least one ether group (—O—) and at least one sulfone group [—S(=O)₂—]. A poly(biphenyl ether sulfone) may further comprise one or more arylene groups other than the p-biphenylene groups, such as phenylene and naphthylene groups. Polyphenylsulfones are poly(biphenyl ether sulfone)s of a particular type.

The blend (T) may contain one and only one poly(biphenyl ether sulfone) (P3). Alternatively, the blend (T) may contain two or more one poly(biphenyl ether sulfone)s (P3); for example, it may contain at least one polyphenylsulfone and at least one poly(biphenyl ether sulfone) of which the recurring units (R3) containing at least 2 sulfone groups, such as the recurring units of formulae (8) to (11) as defined afterwards.

More preferably, the recurring units (R3) are of one or more formulae of the general type:

(7)

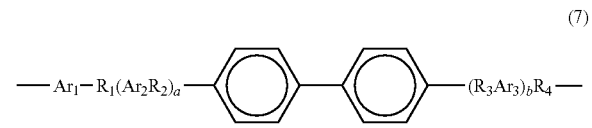

wherein $R_1$ through $R_4$ are —O—, —SO₂—, —S—, —C(=O)—, with the proviso that at least one of $R_1$ through $R_4$ is —SO₂— and at least one of $R_1$ through $R_4$ is —O—; $Ar_1$, $Ar_2$ and $Ar_3$ are arylene groups containing 6 to 24 carbon atoms, and are preferably phenylene or p-biphenylene; and a and b are either 0 or 1.

Still more preferably, the recurring units (R3) are chosen from

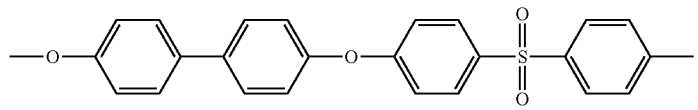
(3)

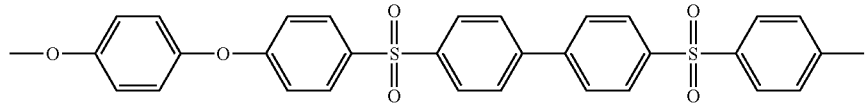
(8)

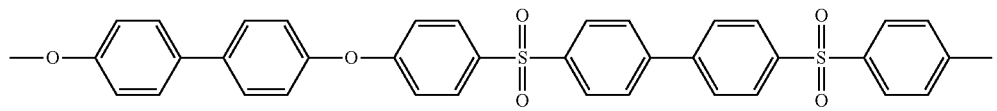
(9)

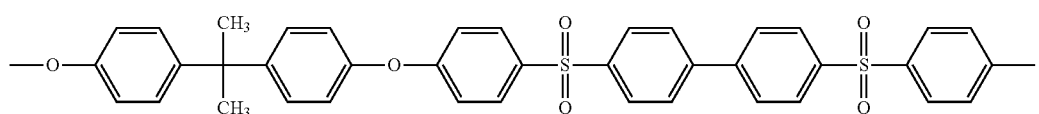
(10)

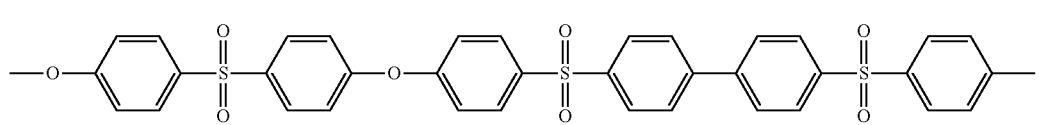
(11)

and mixtures thereof.

The most preferably, the recurring units (R3) are:

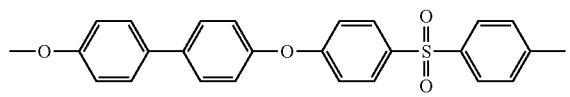
(3)

Otherwise said, the most preferred poly(aryl ether sulfone) is a polyphenylsulfone.

The poly(aryl ether sulfone) (P3) may be notably a homopolymer, a random, alternating or block copolymer. When the poly(aryl ether sulfone) (P3) is a copolymer, its recurring units may notably be composed of:

recurring units (R3) of at least two different formulae chosen among formulae (3), (8), (9), (10) and (11), or recurring units (R3) of one or more formulae chosen among formulae (3), (8), (9), (10) and (11), and recurring units (R3) of one or more formulae chosen among formulae (4), (5) and (6).

Preferably more than 70 wt. %, more preferably more than 85 wt. % of the recurring units of the poly(aryl ether sulfone) (P3) are recurring units (R3). Still more preferably, essentially all the recurring units of the poly(aryl ether sulfone) (P3) are recurring units (R3). The most preferably, all the recurring units of the poly(aryl ether sulfone) (P3) are recurring units (R3).

Excellent results were obtained when the poly(aryl ether sulfone) (P3) was a polyphenylsulfone homopolymer, i.e. a polymer of which essentially all, if not all, the recurring units are of formula (3).

The poly(aryl ether sulfone) (P3) can be prepared by any method. Methods well known in the art are those described in U.S. Pat. Nos. 3,634,355; 4,008,203; 4,108,837 and 4,175,175, the whole content of which is herein incorporated by reference.

Optional Ingredients of the Blend (T)

The blend (T) may further contain a variety of polymers other than (P1$^+$), (P2) and (P3), and additives, fillers, and the like, collectively called ingredients. Conventional ingredients of polyarylene, poly(aryl ether ketone) and poly(aryl ether sulfone) compositions, include fibrous reinforcing agents, particulate fillers and nucleating agents such as talc and silica, adhesion promoters, compatibilizers, curing agents, lubricants, metal particles, mold release agents, organic and/or inorganic pigments like $TiO_2$ and carbon black, dyes, flame retardants, smoke-suppressing agents, heat stabilizers, antioxidants, UV absorbers, tougheners such as rubbers, plasticizers, anti-static agents, melt viscosity depressants such as liquid crystalline polymers and the like.

The weight of said optional ingredients, based on the total weight of the blend (T), is advantageously below 75%, preferably below 50%, more preferably below 25% and still more preferably below 10%. Good results were obtained when the blend (T) was essentially free, or even was completely free, of said optional ingredients.

In particular, the blend (T) may further contain a fibrous reinforcing agent, in particular an inorganic fibrous reinforcing agent such as glass fiber and carbon fiber. Thus, in a certain particular non preferred embodiment, the blend (T) comprises from 10 to 50 wt. %, in particular from 20 to 30 wt. %, of a reinforcing agent (all percentages based on the total weight of the blend); an example of such a blend is one composed of 35 wt. % of a kinked rigid-rod polyphenylene homopolymer, 35 wt. % of a polyetheretherketone homopolymer and 30 wt. % of glass fiber. On the other hand, preference is given to a blend (T) wherein the weight of fibrous reinforcing agent, based on the total weight of the blend (T), is below 10% and preferably below 5%, and excellent results were obtained when the blend (T) was essentially free, or even was completely free, of any fibrous reinforcing agent.

The Polymer Blend (T) is Well Suited for Flexible Risers Applications

The Applicant has surprisingly found that the polymer blend (T) was well suited notably for producing certain layers of flexible pipes for transporting hydrocarbons.

Then, a first particular aspect of the present invention, as described in U.S. application No. 60/912,989, concerns a polymer blend (T') suitable for producing a layer of a flexible pipe for transporting hydrocarbons, said polymer blend (T') comprising:

at least one polyarylene (P1'), and
a mix (M23') selected from the group consisting of (i) mixes of at least one poly(aryl ether ketone) (P2') and at least one poly(aryl ether sulfone) (P3'), and (ii) mixes of at least one poly(aryl ether ketone) (P2'), at least one poly(aryl ether sulfone) (P3') and at least one fluoropolymer (P4').

Any polyarylene can be used as the polyarylene (P1'). The polyarylene (P1') comprised in the polymer blend (T') is advantageously a polymer of which more than 50 wt. % of the recurring units are recurring units (R1') of one or more formulae consisting of an optionally substituted arylene group, provided said optionally substituted arylene group is linked by each of its two ends to two other optionally substituted arylene groups via a direct C—C linkage, as defined in U.S. application No. 60/912,989. The polyarylene (P1') comprised in the polymer blend (T') is also advantageously the polyarylene (P1) in a form other than fibers, as above described. Good results are obtained when the polyarylene (P1') is a polyphenylene.

Any poly(aryl ether ketone) can be used as the poly(aryl ether ketone) (P2'). The poly(aryl ether ketone) (P2') is advantageously a polycondensate, of which more than 50 wt. % of the recurring units are recurring units (R2') of one or more formulae containing at least one arylene group, at least one ether group (—O—) and at least one ketone group [—C(=O)—], the said one or more formulae being free of sulfone group [—S(=O)$_2$—], as defined in U.S. application No. 60/912,989. The poly(aryl ether ketone) (P2') comprised in the polymer blend (T') is also advantageously the poly(aryl ether ketone) (P2) as above described. Good results are obtained when the poly(aryl ether ketone) (P2') is a polyetheretherketone.

Any poly(aryl ether sulfone) can be used as the poly(aryl ether sulfone) (P3'). The poly(aryl ether sulfone) (P3') comprised in the polymer blend (T') is advantageously a polymer other than the polyarylene (P1'), generally a polycondensate, of which more than 50 wt. % of the recurring units are recurring units (R3') of one or more formulae containing at least one arylene group, at least one and at least one ether group (—O—) and at least one sulfone group [—S(=O)$_2$—]. The poly(aryl ether sulfone) (P3') comprised in the polymer blend (T') is also advantageously the poly(aryl ether sulfone) (P3) as above described. Good results are obtained when the poly (aryl ether sulfone) (P3') is a polyphenylsulfone.

Any fluoropolymer can be used as the fluoropolymer (P4'). The fluoropolymer (P4') may be a polytetrafluoroethylene, an ETFE, a CTFE, an ECTFE, a polyvinylidene fluoride or a perfluoroalkylvinylether [like perfluoromethylvinylether (MFA) and perfluoropropylvinylether (PFA)]. Good results are obtained when the fluoropolymer (P4') is a polytetrafluoroethylene.

The mix (M23') consists preferably of at least one poly(aryl ether ketone) (P2') and at least one poly(aryl ether sulfone) (P3').

In the polymer blend (T'), the weight of the polyarylene (P1'), based on the weight of the polymer blend (T'), may be notably of at least 1, 2, 5, 10, 20, 30, 40, 50, 60, 70, 80 or 90%. On the other hand, the weight of the polyarylene (P1'), based on the weight of the polymer blend (T'), may be notably of at most 90, 80, 70, 60, 50, 40, 30, 20 or 10%. The following amounts lower and upper limits may be used as lower and upper limits for the weight of the polyarylene (P1') notably for sub-embodiments (E'-1) and (E'-2) as detailed below, insofar as these limits are compatible with the requirements of these sub-embodiments.

In a first sub-embodiment (E'-1), the weight of the polyarylene (P1'), based on the weight of the polymer blend (T'), is preferably between 50% and 100%, more preferably between 55 and 85%, still more preferably between 60 and 70%. In sub-embodiment (E'-1), the weight of the mix (M23'), based on the weight of the polymer blend (T'), is preferably from 5 to 45%, more preferably from 15 to 45%, still more preferably from 30 to 40%.

In a second sub-embodiment (E'-2), the weight of the polyarylene (P1'), based on the weight of the polymer blend (T') is of at most 50%; it is preferably of at most 40%. In sub-embodiment (E'-2), the weight of the mix (M23'), based on the weight of the polymer blend (T'), is preferably from 50 to 99%, more preferably from 55 to 90%, and still more preferably from 60 to 70%. In sub-embodiment (E'-2), the polymer blend (T') comprises preferably from 0 to 40%, more preferably from 0 to 20%, still more preferably from 0 to 5%, of at least one non polymeric ingredient; the most preferably, the polymer blend (T') is essentially free, or even free, of non polymeric ingredient.

Another particular aspect of the present invention, as described in U.S. application No. 60/909,514, concerns a polymer composition (T") suitable for producing a layer of a flexible pipe for transporting hydrocarbons, said polymer composition (T") comprising:

at least one polyarylene (P1") selected from the group consisting of polyphenylenes,
at least one poly(aryl ether ketone) (P2"), and
at least one poly(aryl ether sulfone) (P3")
wherein:
the weight of the poly(aryl ether ketone) (P2"), based on the total weight of the poly(aryl ether ketone) (P2") and the poly(aryl ether sulfone) (P3"), is from 35% to 95%, and
the polymer composition (T") is free of epoxy resin modified by at least one aromatic polyamine, or comprises the said epoxy resin modified by at least one polyamine in a weight amount of at most 10%, based on the total weight of the polymer composition (T").

Any polyphenylene can be used as the polyarylene (P1"). The polyarylene (P1") comprised in the polymer composition (T") is advantageously the polyarylene (P1) in a form other than fibers as above described, provided said polyarylene (P1) is selected from the group consisting of polyphenylenes.

Any poly(aryl ether ketone) can be used as the poly(aryl ether ketone) (P2"). The poly(aryl ether ketone) (P2") comprised in the polymer composition (T") is advantageously a polymer, generally a polycondensate, of which more than 50 wt. % of the recurring units are recurring units (R2") of one or more formulae containing at least one arylene group, at least one ether group (—O—) and at least one ketone group [—C(=O)—], the said one or more formulae being free of sulfone group [—S(=O)$_2$—], as defined in U.S. application No.

60/909,514. The poly(aryl ether ketone) (P2") comprised in the polymer composition (T") is also advantageously the poly(aryl ether ketone) (P2) as above described. Good results are obtained when the poly(aryl ether ketone) (P2") is a polyetheretherketone.

Any poly(aryl ether sulfone) can be used as the poly(aryl ether sulfone) (P3"). The poly(aryl ether sulfone) (P3") comprised in the polymer composition (T") is advantageously a polymer, generally a polycondensate, of which more than 50 wt. % of the recurring units are recurring units (R3") of one or more formulae containing at least one arylene group, at least one and at least one ether group (—O—) and at least one sulfone group [—S(=O)$_2$—], as defined in U.S. application No. 60/909,514. The poly(aryl ether sulfone) (P3") comprised in the polymer composition (T") is also advantageously the poly(aryl ether sulfone) (P3) as above described. Good results are obtained when the poly(aryl ether sulfone) (P3") is a polyphenylsulfone.

In the polymer composition (T"), the weight of the poly (aryl ether ketone) (P2"), based on the total weight of the poly(aryl ether ketone) (P2") and the poly(aryl ether sulfone) (P3"), may be of at least 40, 45 or 50%; it is preferably above 50%, more preferably above 55%, and still more preferably at most 60%. On the other hand, the weight of the poly(aryl ether ketone) (P2"), based on the total weight of the poly(aryl ether ketone) (P2") and the poly(aryl ether sulfone) (P3"), may be of at most 90, 85 or 80%; it is preferably below 80%, more preferably below 75% and still more preferably below 70%.

In the polymer composition (T"), the total weight of the poly(aryl ether ketone) (P2") and the poly(aryl ether sulfone) (P3"), based on the total weight of the polymer composition (T"), is advantageously above 35%, preferably above 55%, more preferably above 65%, and still more preferably above 75%. In certain embodiments, the total weight of the poly (aryl ether ketone) (P2") and the poly(aryl ether sulfone) (P3"), based on the total weight of the polymer composition (T"), may be above 80%, 90% or 95%.

In the polymer composition (T"), the weight amount of the polyarylene (P1"), based on the total weight of the polymer composition (T"), is generally below 30%; the weight amount of the polymer (P1"), based on the total weight of the polymer composition (T"), may be of at most 25%, 20%, 15% or 10%. Besides, it may be of at least 1%, 2%, 3%, 5% or 10%, based on the total weight of the polymer composition (T").

The polymer blends (T') and (T") may contain additional ingredients. Unless incompatible with the nature of the polymer blends (T') and (T"), all what was mentioned here above concerning the optional ingredients of the polymer blend (T) can apply, mutatis mutandis, to the polymer blends (T') and (T").

As above said, the polymer blend (T) is well suited for producing a polymer layer comprised in a flexible pipe for transporting hydrocarbons, and still another particular aspect of the present invention is directed to said flexible pipe itself; in particular, the polymer blends (T') and (T") are especially well suited for this purpose. The polymer layer is advantageously an antiwear polymer layer, which separates two metal armor plies, and it may be produced by helically winding a tape composed of the polymer blend (T), (T') or (T").

The Preparation of the Invented Blends

The blends (B) and (T) can be prepared by any method.

An aspect of the present invention is directed to a method for preparing the blend (B) as above described which comprises mixing at least one polyarylene (P1) in a form other than fibers with at least one poly(aryl ether ketone) (P2), at a temperature above the melt temperature of the polyarylene (P1) and the melt temperature of the poly(aryl ether ketone) (P2).

Another aspect of the present invention is directed to a method for preparing the blend (T) as above described which comprises mixing at least one polyarylene (P1$^+$) with at least one poly(aryl ether ketone) (P2) and at least one poly(aryl ether sulfone) (P3), at a temperature above the melt temperature of the poly(aryl ether ketone) (P2) and the melt temperature of the poly(aryl ether sulfone) (P3). The mixing takes preferably place at a temperature which is also above the melt temperature of the poly(arylene) (P1$^+$).

For the purpose of the present invention, the melt temperature of a polymer is its glass transition temperature, if said polymer is amorphous, and its melting point, if said polymer is semi-crystalline.

The melt temperature of the polyarylene (P1) [or (P1$^+$)], the melt temperature of the poly(aryl ether ketone) (P2) and the melt temperature of the poly(aryl ether sulfone) (P3) can be measured by any suitable technique known from the skilled in the art. Very often, it is measured by Differential Scanning Calorimetry, using for example a Universal V3.7A Instruments DSC calorimeter. For this purpose, it is preliminarily checked that the calorimeter is well-calibrated by means of a calibration sample. Then, the polymer of which the melt temperature has to be measured [polymer (P1) or (P2) or (P3) or the like] is submitted to the following heating/cooling cycle: 1$^{st}$ heating from room temperature (20° C.) up to T$_{max}$ at a rate of 10° C./min, followed by cooling from T$_{max}$ down to room temperature at a rate of 20° C./min, followed by 2$^{nd}$ heating from room temperature up to T$_{max}$ at a rate of 10° C./min. Here, T$_{max}$ denotes the maximum temperature of the cycle; T$_{max}$ is chosen so as to be well above the melt temperature of the polymer submitted to the determination, but well below the temperature at which the polymer starts to degrade; values of T$_{max}$ of from about 30° C. to about 100° C. above the melt temperature are in general suitable; values of T$_{max}$ of about 220° C. may be appropriate to measure the melt temperature, in particular the glass transition temperature, of the polyarylene (P1), while values of T$_{max}$ of about 400° C. may be appropriate to measure the melt temperature, in particular the melting point, of the poly(aryl ether ketone) (P2).

The melt temperature was measured during 2$^{nd}$ heating.

When the melt temperature of the polymer (P1) or (P2) or (P3) or the like is its melting point, melting is an endothermic first-order transition that appears as a negative peak on the DSC scan. The melting point is advantageously determined by a certain construction procedure on the heat flow curve: the intersection of the two lines that are tangent to the peak at the points of inflection on either side of the peak define the peak temperature, namely the melting point.

When the glass transition temperature of the polymer (P1) or (P2) or (P3) or the like is its glass transition temperature, this one is advantageously determined by a certain other construction procedure on the heat flow curve: a first tangent line to the curve above the transition region is constructed; a second tangent line to the curve below the transition region is also constructed; the temperature on the curve halfway between the two tangent lines, or ½ delta Cp, is the glass transition temperature.

The mixing of the polyarylene (P1) [or (P1$^+$)] with the poly(aryl ether ketone) (P2) [and possibly in addition, with the poly(aryl ether sulfone) (P3)] can be achieved by any appropriate means. The mixing is advantageously made under a sufficiently high shear, so as to achieve a high degree of mixing of all the polymers in the blend (B) or (T) ("shear-mixing"). The mixing can notably be achieved in a desirable manner by extruding the polyarylene (P1) [or (P1⁺)] with the poly(aryl ether ketone) (P2) [and possibly in addition, with the poly(aryl ether sulfone) (P3)], at a temperature above the melt temperature of each of the extruded polymers, so as to obtained strands of the blend (B) [or of the blend (T)]. Very preferably, the so-obtained strands are then chopped into pellets.

The invented method preferably further comprises the step of dry mixing the polyarylene (P1) [or (P1⁺)] with the poly(aryl ether ketone) (P2) [and possibly in addition, with the poly(aryl ether sulfone) (P3)], preferably in powder or in granular form, at a temperature below the melt temperature of each of the polymers, prior to the mixing step itself.

End Uses of the Invented Blend

As previously mentioned, another aspect of the present invention is directed to a shaped article or a part of a shaped article comprising the blend (B) or the blend (T) as above described.

Non limitative examples of shaped articles or part of shaped articles in accordance with the present invention include:

Films

Many different methods may be used to form films. Either continuous or batch processes may be used.

Films may be formed from solution. The solution comprises generally an organic liquid (solvent), which dissolves advantageously the polyarylene (P1) [or (P1⁺)] and the poly(aryl ether ketone) (P2) [and, if present, the poly(aryl ether sulfone) (P3)].

Films may also be formed from the melt of the blend (B) or the blend (T). Films may be extruded from the melt through a slit. Films may be formed by blow extrusion. Films may also be further processed by stretching and/or annealing. Special films such as bilayers, laminates, porous films, textured films and the like may be produced by techniques known in the art.

Films comprising the blend (B) or the blend (T) may be oriented by stretching. Stretching along one dimension will result in uniaxial orientation. Stretching in two dimensions will give biaxial orientation. Stretching may be aided by heating near the glass transition temperature. Stretching may also be aided by plasticizers. More complex processes such as applying alternating cycles of stretching and annealing may also be used with the blends of the present invention.

Coatings

In contrast with films which are generally uncoated, coatings are usually coated on a substrate. The expression "coated on a substrate" should be understood in its common sense, i.e. that the coating forms a cover over the surface of a substrate, thereby without including any limitation as to the process used to achieve the coating. The surface of the substrate may be partly or completely covered by the coating.

The thickness of the coating is usually of at least 1 µm, preferably of at least 5 µm, more preferably of at least 10 µm, and still more preferably of at least 20 µm. Besides, the thickness of the coating is usually of at most 10000 µm, preferably of at most 1000 µm, more preferably of at most 500 µm. In certain embodiments, the thickness of the coating may be of no more than 200 µm, and even non more than 100 µm.

Coatings may be formed by known techniques, including but not limited to, powder coating, laminating preformed films, coating from solution or from the melt, and like methods.

An aspect of the present invention is an article comprising a substrate, onto which the coating as above described is coated.

A particular aspect of the present invention of particularly high technical interest is directed to the use of the coating as above described, for ablative insulation. Accordingly, the coating is coated on a substrate such as a metal, and the coating is submitted to an aggressive agent which destroys partly or completely the coating; the coating is then used as a "sacrificed" layer, to protect the substrate against the aggressive agent. A first type of aggressive agent is a body which is in relative motion with regard to the coating and rubs against it; the body is usually more abrasive than the coating itself. Another type of aggressive agent lies in flames, which may originate from uncontrolled or controlled fires, in particular from the deliberate combustion of fuels. Still another type of aggressive agent is chosen from chemicals. Combinations of these different types of aggressive agents are also encompassed.

Membranes

The blend (B) and the blend (T) may be fabricated into membranes useful for separations of mixed gases, liquids and solids.

Other Shaped Articles or Parts of Shaped Articles

The blend (B) and the blend (T) may also be fabricated into sheets, and various three-dimensional shaped articles and parts of shaped articles.

Various molding techniques may be used to form shaped articles from the blends (B) and (T):

Molding Techniques

Powders, pellets, beads, flakes, reground material or other forms of the blend (B) or of the blend (T) may be molded, with or without liquid or other additives, premixed or fed separately. In particular embodiments, the blend (B) and the blend (T) may be compression molded. Exact conditions may be determined by trial and error molding of small samples. Upper temperature limits may be estimated from thermal analysis such as thermogravimetric analysis. Lower temperature limits may be estimated from Tg as measured for example by dynamic mechanical thermal analysis (DMTA), differential scanning calorimetry (DSC), or like methods. The blend (B) and the blend (T) can be injection molded. It is also desirable if the blend (B) or (T) can be remelted several times without degradation, so that regrind from molding processes can be used. One skilled in the art will recognize that other factors also influence injection moldability including the material's stress relaxation properties and the temperature dependence of melt viscosity.

Extrusion Techniques

The blend (B) and the blend (T) can also be extruded. Non-limiting examples include angle, channel, hexagonal bar, hollow bar, I-beam, joining strip, tubes, rectangular tube, rod, sheet, plate, square bar, square tube, T-section, thin-walled tubes, microtubes, strands, rectangular strands, or other shapes as is required for a particular application. Related to extrusion is pultrusion, wherein a fiber reinforcement, such as glass or carbon fiber, is continuously added to a matrix of extruded blend (B) or (T) at molten state; composites with exceptional moduli and compressive strength will result.

Thermoforming

Sheet stock may be cut, stamped, welded, or thermally formed. For example, printed wiring boards may be fabricated from sheet or thick films by a process wherein copper is deposited on to one or both sides, patterned by standard photolithographic methods, etched, then holes are drilled, and several such sheets laminated together to form a finished board. Sheet and film may also be thermoformed into any variety of housings, cabinets, containers, covers, chassis, plates, panels, fenders, hoods, and the like.

The present invention is described in greater detail below by referring to the examples; however, the present invention is not limited to these examples.

The Unexpected Merits of the Invention

It was surprisingly found that, in spite of substantial discrepancies in their molecular structure, the polyarylene (P1) and the poly(aryl ether ketone) (P2) contained in the blend (B) were in general at least partially miscible with each other, the miscible portion of both polymers forming then a single phase [(P1) being solubilized in (P2) or the contrary, depending on the relative amounts of both polymers].

Also surprisingly, the blend (B) exhibits an excellent balance of properties, including:
very high strength,
very high stiffness,
good elongation properties,
good melt processability (in particular, they are well suited for injection molding applications), and
high chemical resistance.

More surprisingly, the presently invented blend (B) exhibits an outstanding thermal resistance, inhibiting thereby undesirable outgassing even when submitted at very high temperature (380° C. or so); the thermal resistance of the invented blend is generally as high as that of neat poly(aryl ether ketone), even when a low amount of poly(aryl ether ketone) is contained in the invented blend. Even more surprisingly, the presently invented blend (B) exhibits an outstanding impact resistance, as characterized by a standard no-notch IZOD test (ASTM D-4810); the impact resistance of the invented blend is generally higher than that of neat polyarylene and neat poly(aryl ether ketone) taken individually; this synergistic behavior is so strong that optimized blends have an impact resistance, as determined by no-notch IZOD test defined in ASTM D-4810, which is as high as twice, or even more, that of polyarylene and poly(aryl ether ketone) taken individually.

On the other, the Applicant has surprisingly found that the additional presence of a poly(aryl ether sulfone) (P3) in a blend comprising a polyarylene and a poly(aryl ether ketone), such as the above described blend (B), resulted in a blend (T) having several substantially improved properties when compared to the blend (B), while maintaining all its beneficial properties at a high level. Among the improved properties, the elongation at break and the impact resistance are dramatically increased. Also, the poly(aryl ether sulfone) (P3) acts as a compatibilizer, and provides blends of improved morphology, wherein the polyarylene and the poly(aryl ether ketone) domain sizes are substantially finer than absent the poly(aryl ether sulfone) (P3).

EXAMPLES

1st Set of Examples

The polymers that were used are:
a polyphenylene copolymer essentially all, if not all, the recurring units of which consisted of a mix of p-phenylene substituted by a phenylketone group with unsubstituted m-phenylene in a mole ratio p-phenylene:m-phenylene of about 50:50, commercially available from Solvay Advanced Polymers, L.L.C. as PRIMOSPIRE® PR-250 polyphenylene,
and
a polyetheretherketone (PEEK) homopolymer, essentially all, if not all, the recurring units are of formula (VII)

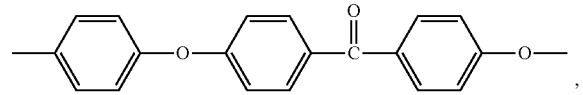

(VII)

commercially available from Victrex Manufacturing Ltd. as VICTREX® 150 P.

All the blends according to the present invention [(B1), (B2) and (B3)], as well as the neat polyphenylene and PEEK controls [(CE1) and (CE2)], were compounded on a Berstorff 25 mm twin-screw co-rotating intermeshing extruder.

In the case of the two neat polymer controls (CE1) and (CE2), the compounding step was to convert the resins from powder to pellet form and to impart the same heat history seen by the blends on the base polymers.

Mechanical property tests were conducted per the ASTM methods indicated using 3.2 mm-thick ASTM specimens.

Isothermal thermogravimetric analysis (TGA) weight loss rate was measured in nitrogen after rapid heat up to 380° C. (100° C./min) followed by a hold duration of 40 minutes. The rate of weight loss (ppm/min) was computed from the slope of the TGA weight versus time plot over the time interval from 40 to 60 minutes.

The results are presented in table 1 below.

TABLE 1

|  | ASTM Method | (CE1) | (B1) | (B2) | (B3) | (CE2) |
|---|---|---|---|---|---|---|
| VICTREX ® 150 P PEEK (parts by weight) |  | 100 | 70 | 50 | 30 | — |
| PRIMOSPIRE ® PR-250 polyphenylene (parts by weight) |  | — | 30 | 50 | 70 | 100 |
| Tensile strength at yield (psi) | D-638 | 14300 | 14900 | 17400 | 19600 | 23800 |
| Tensile modulus (ksi) | D-638 | 514 | 584 | 654 | 723 | 874 |
| Tensile elongation at yield (%) | D-638 | 5.5 | 4.4 | 4.6 | 4.8 | No Yield |
| Flexural strength (psi) | D-790 | 21600 | 23400 | 26900 | 29900 | 36600 |
| Flexural modulus (ksi) | D-790 | 538 | 594 | 677 | 757 | 921 |
| Heat deflection temperature (° C.) | D-648 | 147.0 | 147.8 | 149.0 | 149.7 | 152.1 |
| No-notch Izod (ft-lb/in) | D-4812 | 16 | 26 | 35 | 32 | 20 |
| Weight loss rate by isothermal TGA at 380° C. (ppm/min) | — | 10 | 10 | 10 | 10 | 30 |

Blends (B1) to (B3) (according to the invention), especially blends (B2) and (B3), exhibited an excellent balance of properties, including a very high strength, a very high stiffness.

They exhibited also good elongation properties, including when an amount of polyphenylene as high as 70 parts by weight was used, as it is the case for blend (B3).

Blends (B1) to (B3) exhibited also an outstanding thermal resistance, inhibiting thereby undesirable outgassing even when submitted at very high temperature (380° C. or so); the thermal resistance of the invented blend was indeed as high as that of neat poly(aryl ether ketone), even when an amount of as low as 30 parts by weight of such poly(aryl ether ketone) was used, as it was the case for blend (B3).

Finally, the presently invented blends (B1), (B2) and (B3) exhibited an outstanding impact resistance, as characterized by a standard no-notch IZOD test (ASTM D-4810); the impact resistance of all the prepared blends was much higher than that of neat polyarylene and neat poly(aryl ether ketone) taken individually (strong synergistic behavior); in particular, the impact resistance of blends (B2) and (B3), as determined by no-notch IZOD test defined in ASTM D-4810, is more than 1.5 times as high as that of the impact resistance of the better polymer of the blend in terms of impact resistance, here the polyphenylene.

2$^{nd}$ Set of Examples

The polymers that were used are:
polyphenylene copolymer essentially all, if not all, the recurring units of which consisted of a mix of p-phenylene substituted by a phenylketone group with unsubstituted m-phenylene in a mole ratio p-phenylene:m-phenylene of about 50:50, commercially available from Solvay Advanced Polymers, L.L.C. as PRIMOSPIRE® PR-250P polyphenylene,
a polyetheretherketone (PEEK) homopolymer, essentially all, if not all, the recurring units are of formula (VII)

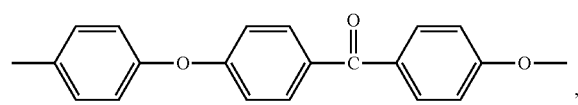
(VII)

commercially available from Victrex Manufacturing Ltd. as VICTREX® 150 P, and a polyphenylsulfone (PPSU) homopolymer, essentially all, if not all, the recurring units are of formula (3)

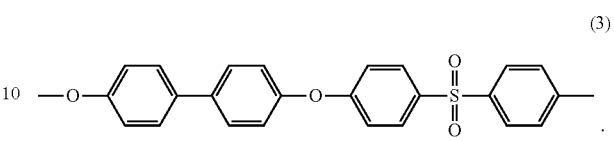
(3)

In the present set of examples, three binary blends according to the present invention [(B4), (B5) and (B6)] composed of the above mentioned polyphenylene copolymer and PEEK homopolymer in various proportions, were compared with three ternary blends, also in accordance with the present invention [named respectively (T4), (T5) and (T6)], which were obtained by replacing, weight pro weight, in the blends (B4), (B5) and (B6), 5 parts of the polyphenylene copolymer and 5 parts of the PEEK homopolymer by 10 parts of the PPSU homopolymer.

The six polymer blends were prepared by first tumbling the polymers to be compounded, in resinous form, for about 20 minutes, followed by melt compounding using an 18 mm Leistritz corotating intermeshing twin screw extruder having 6 barrel zones, with barrels 2 to 6 being heated, as detailed below:

barrel 2: set point=305° C., barrels 3, 4 and 5: set point=355° C., barrel 6: set point=360° C.

The set point for the die temperature was fixed to 360° C., and the set point for the screw speed was fixed to 250 rpm.

The feed rate was of about 10 lb/h, and the vacuum level was of about 950 mbar.

The detailed formulations of the six blends are mentioned in Table 2 below.

Mechanical property tests were conducted per the ASTM methods indicated using 3.2 mm-thick (0.125 inch-thick) ASTM specimens.

The results are also presented in table 2 below.

TABLE 2

|  | ASTM Method | Blend (B4) | Blend (T4) | Blend (B5) | Blend (T5) | Blend (B6) | Blend (T6) |
| --- | --- | --- | --- | --- | --- | --- | --- |
| VICTREX ® 150 P PEEK (parts by weight) |  | 60 | 55 | 50 | 45 | 40 | 35 |
| PRIMOSPIRE ® PR-250P polyphenylene (parts by weight) |  | 40 | 35 | 50 | 45 | 60 | 55 |
| RADEL ® R-5000 NT PPSU (parts by weight) |  | — | 10 | — | 10 | — | 10 |
| Tensile strength at yield (psi) | D-638 | 16500 | 15600 | 17500 | 16900 | 18900 | 18300 |
| Tensile strength at break (psi) | D-638 | 15700 | 12800 | 14700 | 13700 | 15200 | 14700 |
| Tensile modulus (ksi) | D-638 | 603 | 574 | 627 | 607 | 674 | 624 |
| Tensile elongation at yield (%) | D-638 | 4.9 | 5.1 | 5.0 | 5.2 | 5.1 | 5.3 |

TABLE 2-continued

| | ASTM Method | Blend (B4) | Blend (T4) | Blend (B5) | Blend (T5) | Blend (B6) | Blend (T6) |
|---|---|---|---|---|---|---|---|
| Tensile elongation at break (%) | D-638 | 6.8 | 11.6 | 11.3 | 21.1 | 11.5 | 14.1 |
| Flexural strength (psi) | D-790 | 23800 | 22200 | 25200 | 23900 | 26700 | 25800 |
| Flexural modulus (ksi) | D-790 | 601 | 563 | 631 | 586 | 663 | 632 |
| No-notch Izod (ft-lb/in) | D-4812 | 37 | No break | 37 | No break | 33 | 50 |

Surprisingly, ternary blend (T5) exhibited a tensile elongation at break about twice higher than that of the corresponding binary blend (B5) free of poly(aryl ether sulfone).

Further, the impact resistance of ternary blend (T5), expressed in terms of no-notch Izod, was dramatically increased when compared that of the corresponding binary blend (B5): the improvement was such that no break at all was observed when ternary blend (T5) passed the no-notch Izod test.

Similar observations were made for blends having a richer poly(aryl ether ketone) content, e.g. for ternary blend (T4) and the corresponding binary blend (B4) free of poly(aryl ether sulfone).

Close observations were also made for blends having a richer polyarylene content, e.g. for ternary blend (T6) and the corresponding binary blend (B6) free of poly(aryl ether sulfone). The ternary blend (T6) exhibited a substantially higher tensile elongation at break than that of the corresponding binary blend (B6) (+about 20%). Further, the additional presence of 10 parts of polyphenylsulfone in the ternary blend (T6) resulted in a no-notch Izod increase of about 50%, when compared to (B6).

More generally, blends (T4), (T5) and (T6) exhibited an excellent balance of properties, a.o. a very high strength, a very high stiffness, and good elongation properties at yield, similar or close to that of the binary blends (B4), (B5) and (B6), and exceeding by far the technical needs of most applications.

Figure 2:
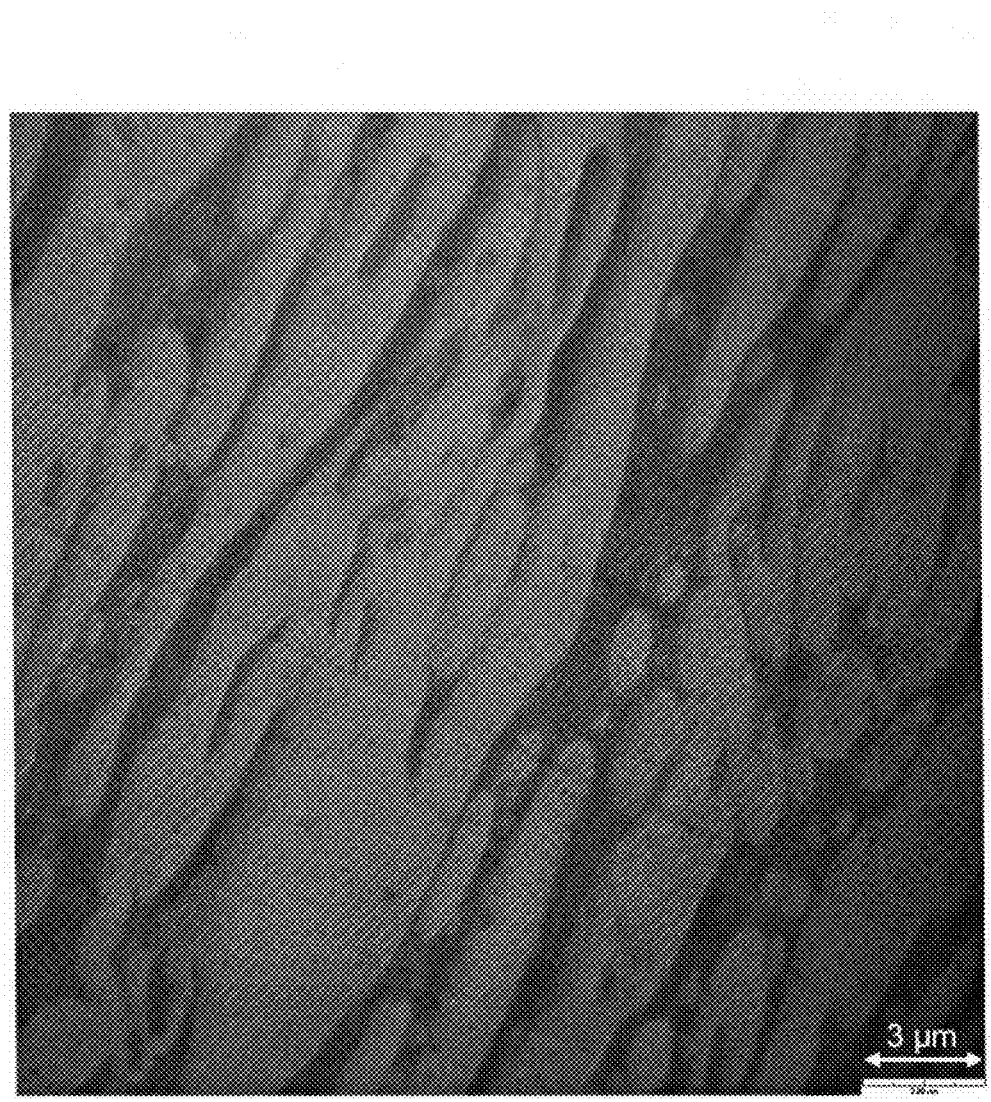
FIG. 2 represents a transmission electron microscope (TEM) photomicrograph of a binary blend (called blend B5) corresponding to the ternary blend (T5).

A transmission electron microscope (TEM) photomicrograph showing the morphology of a ternary blend, namely the blend (T5) with medium PEEK-polyphenylene content, is provided in FIG. 1. A transmission electron microscope (TEM) photomicrograph of the corresponding binary blend (B5) is provided for comparison in FIG. 2. Both photographs were taken using the same equipment, and in identical conditions (e.g. same magnification). The bars shown on micrographs corresponded to an effective length of 3 μm; the light phase was made of polyphenylene. As can be seen from the photographs, the PEEK and polyphenylene domain sizes are much finer in the case where PPSU was added relative to the case of the binary blend. Since both the binary and the ternary blends were melt processed under essentially identical conditions, the finer scale dispersion of the phases in the ternary blend was taken as a clear indication that the small amount of PPSU in the ternary blend (T5) did act as a compatibilizer between the PEEK and the polyphenylene.

3$^{rd}$ Set of Examples

Melt Viscosity Testing

Additional tests dealing with melt viscosity were made with blends (B4) to (B6) and (T4) to (T6) as above detailed, as well as with two neat PEEK and polyphenylene controls, namely the VICTREX® 150 P PEEK and the PRIMOSPIRE® PR-250P polyphenylene included in said blends (B4) to (B6) and (T4) to (T6), hereinafter named respectively (CE3) and (CE4).

Melt thermal stability testing is a melt rheological test performed to assess the ability of a polymer material to experience exposure of the melt to excessive temperatures and/or for significant times without adverse effects on the polymer material. The melt thermal stability test was performed in a capillary rheometer (Dynisco LCR 7001) using a capillary die 0.8 inch long by 0.040 inch in diameter and an entrance angle of 120 degrees. The viscosity of the polymer material at 410° C. and 50 sec$^{-1}$ was measured initially after a 10 minute dwell time at 410° C. in the barrel of the rheometer. The molten polymer material was next allowed to sit in the barrel of the rheometer for an additional 30 minutes (and a total dwell time of 40 minutes) after which the viscosity was again measured and recorded. The 40-min/10-min viscosity ratio was referred to as VR$_{40}$; it is a measure of melt stability. Obviously, the closer the VR$_{40}$ number to unity, the more stable the polymer material is. Typically polymer materials with VR$_{40}$ ratios of 1.0 to 2.0 are generally considered melt stable, whereas VR$_{40}$ numbers of 5 and above are considered unacceptable. Values in between 2 and 5 are of intermediate melt stability, with the lower numbers representing better stability, naturally, consistent with a smaller change in viscosity over time at a temperature of 410° C.

Melt viscosity was measured as a function of shear rate at a test temperature of 400° C. also using the LCR 7001 capillary rheometer and die described above.

The results are reported in table 3 below.

TABLE 3

| | (CE3) | Blend (B4) | Blend (T4) | Blend (B5) | Blend (T5) | Blend (B6) | Blend (T6) | (CE4) |
|---|---|---|---|---|---|---|---|---|
| VICTREX ® 150 P PEEK (parts by weight) | 100 | 60 | 55 | 50 | 45 | 40 | 35 | — |
| PRIMOSPIRE ® PR-250P polyphenylene (parts by weight) | — | 40 | 35 | 50 | 45 | 60 | 55 | 100 |

TABLE 3-continued

| | (CE3) | Blend (B4) | Blend (T4) | Blend (B5) | Blend (T5) | Blend (B6) | Blend (T6) | (CE4) |
|---|---|---|---|---|---|---|---|---|
| RADEL ® R-5000 NT PPSU (parts by weight) | — | — | 10 | — | 10 | — | 10 | — |
| Melt stability $VR_{40}$ at 410° C. | 0.93 | 1.04 | 1.15 | 1.21 | 1.38 | 1.84 | 1.73 | 4.62 |
| Melt viscosity η(poise) at 400° C. | | | | | | | | |
| η at shear rate D = 25 $s^{-1}$ | 4570 | 6610 | 6260 | 7300 | 7250 | 9050 | 8730 | 16250 |
| η at D = 100 $s^{-1}$ | 3430 | 4910 | 4840 | 5290 | 5340 | 6170 | 6180 | 10420 |
| η at D = 500 $s^{-1}$ | 2190 | 2900 | 2970 | 3050 | 3110 | 3330 | 3460 | 4910 |
| η at D = 1500 $s^{-1}$ | 1500 | 1810 | 1880 | 1880 | 1920 | 1960 | 2090 | 2540 |
| η at D = 3500 $s^{-1}$ | 1070 | 1180 | 1240 | 1210 | 1240 | 1230 | 1330 | 1410 |

The key observations were that:

the melt stability of all the binary and ternary blends was much improved when compared to that of neat polyphenylene (CE4); the melt stability of the binary blends (B4) to (B6) was better than would be expected based on the weight average of stabilities of neat PEEK (CE3) and of neat polyphenylene (CE4); the further addition of PPSU to the binary blends did not substantially affect the melt stability of the PEEK-polyphenylene two-component system;

the viscosity of all the binary and ternary blends at low shear rates (e.g. 25-100 s−1) was substantially lower than that for neat polyphenylene (CE4); the viscosity of the binary blends was lower than expected from additivity based on a weighted average of the neat polymers; the viscosity of the blends at low shear rates (e.g. 25-100 s−1) was essentially unchanged (very slightly decreased) after the further addition of PPSU to the binary blends.

The invention claimed is:

1. A blend (B) comprising:
at least one polyarylene (P1) in a form other than fibers, and
at least one polyetheretherketone (PEEK) homopolymer (P2), essentially all the recurring units are of formula (VII):

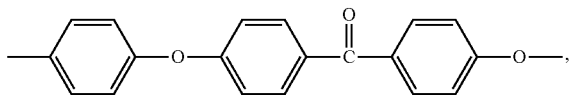

wherein:
more than 90 wt % of the recurring units of the polyarylene (P1) are recurring units (R1) chosen from phenylene groups which are linked by each of their two ends to two other phenylene groups via a direct C—C linkage,
said recurring units (R1) being a mix of recurring units (R1-a) wherein the phenylene groups are p-phenylenes substituted by phenylketone groups, with recurring units (R1-b) wherein the phenylene groups are unsubstituted m-phenylenes,
the mole ratio of the recurring units (R1-b), based on the total number of moles of the recurring units (R1-a) and (R1-b), ranges from 40% to 60%, and
the weight of the polyarylene (P1), based on the total weight of the polyarylene (P1) and the polyetheretherketone (PEEK) homopolymer (P2), ranges from 30% to 70% by weight; and the weight of the polyetheretherketone (PEEK) homopolymer (P2), based on the total weight of the polyarylene (P1) and the polyetheretherketone (PEEK) homopolymer (P2), ranges from 30% to 70% by weight.

2. A method for preparing the bend (B) according to claim 1, which comprises mixing the polyarylene (P1) with the polyetheretherketone (PEEK) homopolymer (P2), at a temperature above the melt temperature of the polyarylene (P1) and the melt temperature of the polyetheretherketone (PEEK) homopolymer (P2).

3. A shaped article or a part of a shaped article comprising the blend (B) according to claim 1.

4. The blend according to claim 1, wherein the mole ratio of the recurring units (R1-b), based on the total number of moles of the recurring units (R1-a) and (R1-b), is a mole ratio of about 50:50.

* * * * *